(12) United States Patent
Sankaran et al.

(10) Patent No.: US 10,970,238 B2
(45) Date of Patent: Apr. 6, 2021

(54) NON-POSTED WRITE TRANSACTIONS FOR A COMPUTER BUS

(71) Applicant: Intel Corporation, Santa Clara, CA (US)

(72) Inventors: Rajesh M. Sankaran, Portland, OR (US); David J. Harriman, Portland, OR (US); Sean O. Stalley, Hillsboro, OR (US); Rupin H. Vakharwala, Hillsboro, OR (US); Ishwar Agarwal, Portland, OR (US); Pratik M. Marolia, Hillsboro, OR (US); Stephen R. Van Doren, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/566,865

(22) Filed: Sep. 10, 2019

(65) Prior Publication Data

US 2020/0004703 A1  Jan. 2, 2020

Related U.S. Application Data

(60) Provisional application No. 62/836,288, filed on Apr. 19, 2019.

(51) Int. Cl.
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0026* (2013.01)

(58) Field of Classification Search
None
See application file for complete search history.

(56) References Cited

U.S. PATENT DOCUMENTS 7,191,255 B2 * 3/2007 Wong ............... G06F 13/423
710/15
9,348,741 B1 * 5/2016 Syu .................. G06F 12/02
(Continued)

FOREIGN PATENT DOCUMENTS

EP  3343367 A1  7/2018
WO  2018125250 A1  7/2018

OTHER PUBLICATIONS

EPO; Extended European Search Report issued in EP Patent Application No. 20155352.6, dated Jul. 2, 2020; 11 pages.

*Primary Examiner* — Farley Abad
*Assistant Examiner* — Dayton Lewis-Taylor
(74) *Attorney, Agent, or Firm* — Alliance IP, LLC

(57) ABSTRACT

Systems and devices can include a controller and a command queue to buffer incoming write requests into the device. The controller can receive, from a client across a link, a non-posted write request (e.g., a deferred memory write (DMWr) request) in a transaction layer packet (TLP) to the command queue; determine that the command queue can accept the DMWr request; identify, from the TLP, a successful completion (SC) message that indicates that the DMWr request was accepted into the command queue; and transmit, to the client across the link, the SC message that indicates that the DMWr request was accepted into the command queue. The controller can receive a second DMWr request in a second TLP; determine that the command queue is full; and transmit a memory request retry status (MRS) message to be transmitted to the client in response to the command queue being full.

25 Claims, 17 Drawing Sheets

(56) References Cited

U.S. PATENT DOCUMENTS

| | | | |
|---|---|---|---|
| 9,753,876 B1 | 9/2017 | Hanscom | |
| 10,592,322 B1* | 3/2020 | Seshadri | G06F 11/324 |
| 10,636,577 B2* | 4/2020 | Bakshi | G06F 11/3051 |
| 2003/0174716 A1* | 9/2003 | Lee | G06F 13/4282 |
| | | | 370/401 |
| 2005/0138260 A1* | 6/2005 | Love | G06F 13/4081 |
| | | | 710/306 |
| 2014/0114887 A1 | 4/2014 | Iyer et al. | |
| 2017/0286113 A1* | 10/2017 | Shanbhogue | G06F 9/30036 |
| 2019/0289102 A1* | 9/2019 | Goel | H04L 41/0266 |
| 2019/0347125 A1 | 11/2019 | Sankaran et al. | |

* cited by examiner

FIG. 9B

NON-POSTED WRITE TRANSACTIONS FOR A COMPUTER BUS

CROSS REFERENCE TO RELATED APPLICATION

Pursuant to 35 U.S.C. § 119(e), this disclosure claims the benefit of U.S. Provisional Patent Application Ser. No. 62/836,288 filed on Apr. 19, 2019, the entire contents of which are incorporated by reference herein.

BACKGROUND

Central Processing Units (CPUs) perform general-purpose computing tasks such as running application software and operating systems. Specialized computing tasks, such as graphics and image processing, are handled by graphics processors, image processors, digital signal processors, and fixed-function accelerators. In today's heterogeneous machines, each type of processor is programmed in a different manner. The era of big data processing demands higher performance at lower energy as compared with today's general-purpose processors. Accelerators (either custom fixed function units or tailored programmable units, for example) are helping meet these demands.

BRIEF DESCRIPTION OF THE DRAWINGS

FIG. 9B is a schematic diagram of a 32-bit DMWr packet definition in accordance with embodiments of the present disclosure.

DETAILED DESCRIPTION

Figure 1:
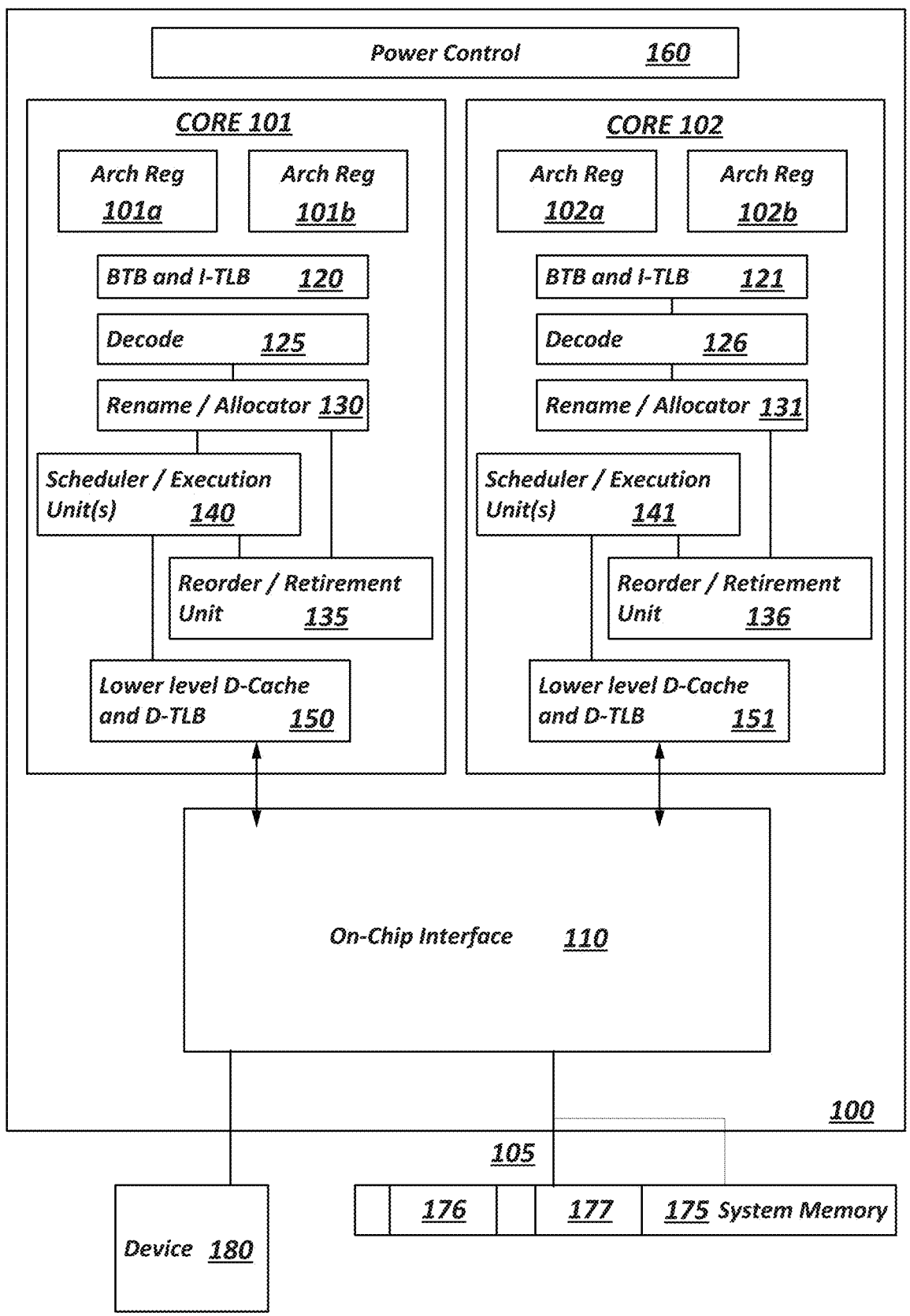
FIG. 1 is a schematic diagram illustrating an embodiment of a block diagram for a computing system including a multicore processor in accordance with embodiments of the present disclosure.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores-core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
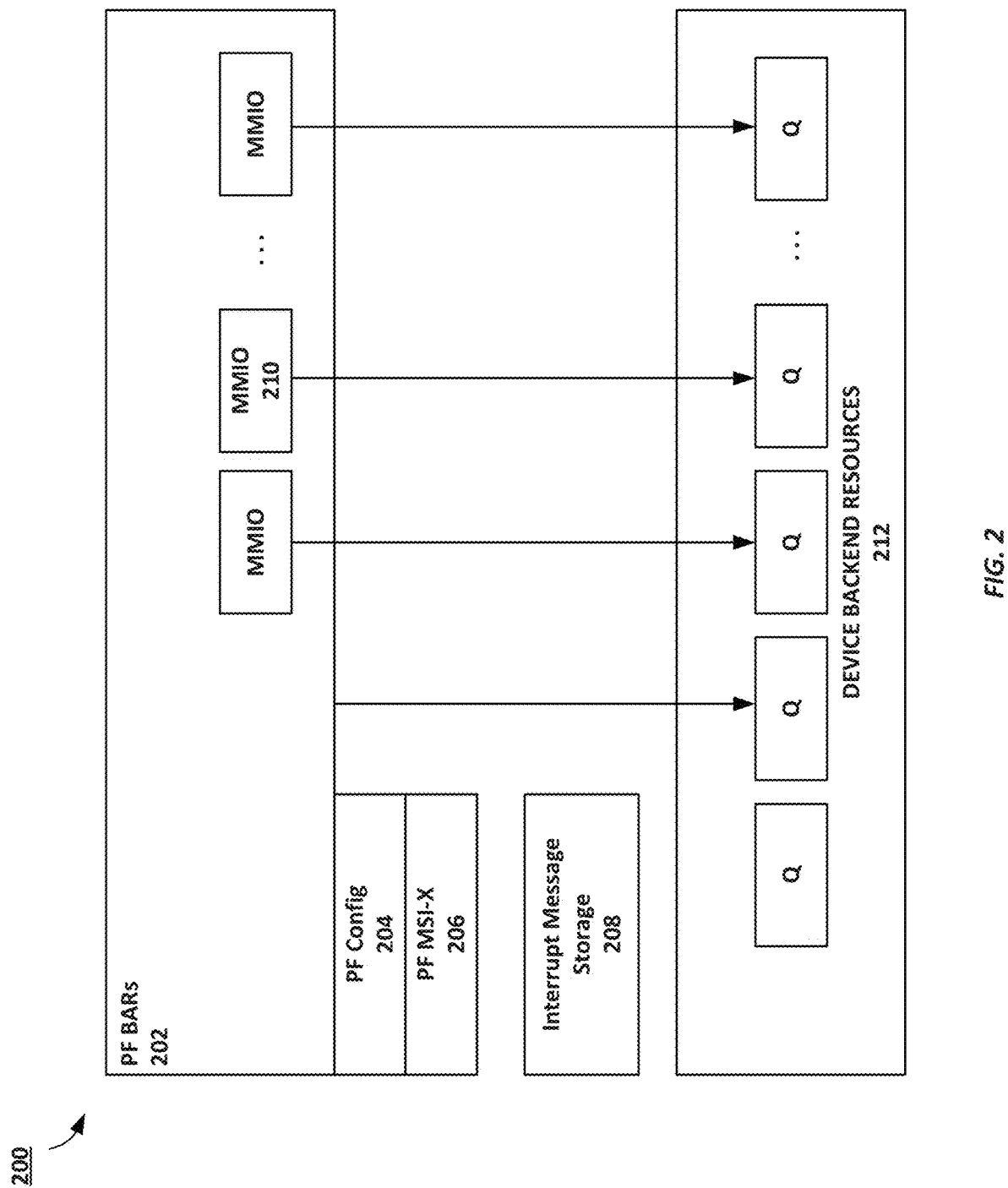
FIG. 2 is a schematic diagram of an example accelerator device in accordance with embodiments of the present disclosure.

FIG. 2 is a schematic diagram of an example accelerator device 200 in accordance with embodiments of the present disclosure. As illustrated in FIG. 2, in one implementation, an accelerator includes PCI configuration registers 204 and MMIO registers 210 which may be programmed to provide access to device backend resources 212. In one implementation, the base addresses for the MMIO registers 210 are specified by a set of Base Address Registers (BARs) 202 in PCI configuration space. Unlike previous implementations, one implementation of the data streaming accelerator (DSA) described herein does not implement multiple channels or PCI functions, so there is only one instance of each register in a device. However, there may be more than one DSA device in a single platform.

An implementation may provide additional performance or debug registers that are not described here. Any such registers should be considered implementation specific.

The PCI configuration space accesses are performed as aligned 1-, 2-, or 4-byte accesses. See the PCI Express Base Specification for rules on accessing unimplemented registers and reserved bits in PCI configuration space.

MMIO space accesses to the BAR0 region (capability, configuration, and status registers) is performed as aligned 1-, 2-, 4- or 8-byte accesses. The 8-byte accesses should only be used for 8-byte registers. Software should not read or write unimplemented registers. The MMIO space accesses to the BAR 2 and BAR 4 regions should be performed as 64-byte accesses, using the ENQCMD, ENQCMDS, or MOVDIR64B instructions (described in detail below). ENQCMD or ENQCMDS should be used to access a work queue that is configured as shared (SWQ), and MOVDIR64B must be used to access a work queue that is configured as dedicated (DWQ).

One implementation of the DSA PCI configuration space implements three 64-bit BARs 202. The Device Control Register (BAR0) is a 64-bit BAR that contains the physical base address of device control registers. These registers provide information about device capabilities, controls to configure and enable the device, and device status. The size of the BAR0 region is dependent on the size of the Interrupt Message Storage 208. The size is 32 KB plus the number of Interrupt Message Storage entries 208 times 16, rounded up to the next power of 2. For example, if the device supports 1024 Interrupt Message Storage entries 208, the Interrupt Message Storage is 16 KB, and the size of BAR0 is 64 KB.

BAR2 is a 64-bit BAR that contains the physical base address of the Privileged and Non-Privileged Portals. Each portal is 64-bytes in size and is located on a separate 4 KB page. This allows the portals to be independently mapped into different address spaces using CPU page tables. The portals are used to submit descriptors to the device. The Privileged Portals are used by kernel-mode software, and the Non-Privileged Portals are used by user-mode software. The number of Non-Privileged Portals is the same as the number of work queues supported. The number of Privileged Portals is Number-of-Work Queues (WQs)×(MSI-X-table-size−1). The address of the portal used to submit a descriptor allows the device to determine which WQ to place the descriptor in, whether the portal is privileged or non-privileged, and which MSI-X table entry may be used for the completion interrupt. For example, if the device supports 8 WQs, the WQ for a given descriptor is (Portal-address >>12) & 0x7. If Portal-address >>15 is 0, the portal is non-privileged; otherwise it is privileged and the MSI-X 206 table index used for the completion interrupt is Portal-address >>15. Bits 5:0 must be 0. Bits 11:6 are ignored; thus any 64-byte-aligned address on the page can be used with the same effect.

Descriptor submissions using a Non-Privileged Portal are subject to the occupancy threshold of the WQ, as configured using a work queue configuration (WQCFG) register. Descriptor submissions using a Privileged Portal are not subject to the threshold. Descriptor submissions to a SWQ must be submitted using ENQCMD or ENQCMDS. Any other write operation to a SWQ portal is ignored. Descriptor submissions to a DWQ must be submitted using a 64-byte write operation. Software uses MOVDIR64B, to guarantee a non-broken 64-byte write. An ENQCMD or ENQCMDS to a disabled or dedicated WQ portal returns Retry. Any other write operation to a DWQ portal is ignored. Any read operation to the BAR2 address space returns all is. Kernel-mode descriptors should be submitted using Privileged Portals in order to receive completion interrupts. If a kernel-mode descriptor is submitted using a Non-Privileged Portal, no completion interrupt can be requested. User-mode descriptors may be submitted using either a Privileged or a Non-Privileged Portal.

The number of portals in the BAR2 region is the number of WQs supported by the device times the MSI-X 206 table size. The MSI-X table size is typically the number of WQs plus 1. So, for example, if the device supports 8 WQs, the useful size of BAR2 would be 8×9×4 KB=288 KB. The total size of BAR2 would be rounded up to the next power of two, or 512 KB.

BAR4 is a 64-bit BAR that contains the physical base address of the Guest Portals. Each Guest Portal is 64-bytes in size and is located in a separate 4 KB page. This allows the portals to be independently mapped into different address spaces using CPU extended page tables (EPT). If the Interrupt Message Storage Support field in GENCAP is 0, this BAR is not implemented.

The Guest Portals may be used by guest kernel-mode software to submit descriptors to the device. The number of Guest Portals is the number of entries in the Interrupt Message Storage times the number of WQs supported. The address of the Guest Portal used to submit a descriptor allows the device to determine the WQ for the descriptor and also the Interrupt Message Storage entry to use to generate a completion interrupt for the descriptor completion (if it is a kernel-mode descriptor, and if the Request Completion Interrupt flag is set in the descriptor). For example, if the device supports 8 WQs, the WQ for a given descriptor is (Guest-portal-address >>12) & 0x7, and the interrupt table entry index used for the completion interrupt is Guest-portal-address >>15.

In one implementation, MSI-X is the only PCIe interrupt capability that DSA provides and DSA does not implement legacy PCI interrupts or MSI. Details of this register structure are in the PCI Express specification.

In one implementation, three PCI Express capabilities control address translation. Only certain combinations of values for these capabilities may be supported, as shown in Table 1. The values are checked at the time the Enable bit in General Control Register (GENCTRL) is set to 1.

TABLE 1

Supported combinations of capabilities and associated values.

| PASID | ATS | PRS | Operation |
|---|---|---|---|
| 1 | 1 | 1 | Virtual or physical addresses may be used, depending on IOMMU configuration. Addresses are translated using the PASID in the descriptor. This is the recommended mode. This mode must be used to allow user-mode access to the device or to allow sharing among multiple guests in a virtualized system. |
| 0 | 1 | 0 | Only physical addresses may be used. Addresses are translated using the BDF of the device and may be GPA or HPA, depending on IOMMU configuration. The PASID in the descriptor is ignored. This mode may be used when address translation is enabled in the IOMMU but the device is only used by the kernel or by a single guest kernel in a virtualized |
| 0 | 0 | 0 | All memory accesses are Untranslated Accesses. Only physical addresses may be used. This mode should be used only if IOMMU address translation is disabled. |
| 0 | 0 | 1 | Not allowed. If software attempts to enable the device with one of these configurations, an error is reported and the device is not enabled. |
| 0 | 1 | 1 | |
| 1 | 0 | 0 | |
| 1 | 0 | 1 | |
| 1 | 1 | 0 | |

If any of these capabilities are changed by software while the device is enabled, the device may halt and an error is reported in the Software Error Register.

In one implementation, software configures the PASID capability to control whether the device uses PASID to perform address translation. If PASID is disabled, only physical addresses may be used. If PASID is enabled, virtual or physical addresses may be used, depending on IOMMU configuration. If PASID is enabled, both address translation services (ATS) and page request services (PRS) should be enabled.

In one implementation, software configures the ATS capability to control whether the device should translate addresses before performing memory accesses. If address translation is enabled in the IOMMU 2810, ATS must be enabled in the device to obtain acceptable system performance. If address translation is not enabled in the IOMMU 2810, ATS must be disabled. If ATS is disabled, only physical addresses may be used and all memory accesses are performed using Untranslated Accesses. ATS must be enabled if PASID is enabled.

In one implementation, software configures the PRS capability to control whether the device can request a page when an address translation fails. PRS must be enabled if PASID is enabled, and must be disabled if PASID is disabled.

Some implementations utilize a virtual memory space that is seamlessly shared between one or more processor cores, accelerator devices, and/or other types of processing devices (e.g., I/O devices). In particular, one implementation utilizes a shared virtual memory (SVM) architecture in which the same virtual memory space is shared between cores, accelerator devices, and/or other processing devices. In addition, some implementations include heterogeneous forms of physical system memory which are addressed using a common virtual memory space. The heterogeneous forms of physical system memory may use different physical interfaces for connecting with the DSA architectures. For example, an accelerator device may be directly coupled to local accelerator memory such as a high bandwidth memory (HBM) and each core may be directly coupled to a host physical memory such as a dynamic random access memory (DRAM). In this example, the shared virtual memory (SVM) is mapped to the combined physical memory of the HBM and DRAM so that the accelerator, processor cores, and/or other processing devices can access the HBM and DRAM using a consistent set of virtual memory addresses.

These and other features accelerators are described in detail below. By way of a brief overview, different implementations may include one or more of the following infrastructure features:

Shared Virtual Memory (SVM):

some implementations support SVM which allows user level applications to submit commands to DSA directly with virtual addresses in the descriptors. DSA may support translating virtual addresses to physical addresses using an input/output memory management unit (IOMMU) including handling page faults. The virtual address ranges referenced by a descriptor may span multiple pages spread across multiple heterogeneous memory types. Additionally, one implementation also supports the use of physical addresses, as long as data buffers are contiguous in physical memory.

Partial Descriptor Completion:

with SVM support, it is possible for an operation to encounter a page fault during address translation. In some cases, the device may terminate processing of the corresponding descriptor at the point where the fault is encountered and provide a completion record to software indicating partial completion and the faulting information to allow software to take remedial actions and retry the operation after resolving the fault.

Batch Processing:

some implementations support submitting descriptors in a "batch." A batch descriptor points to a set of virtually contiguous work descriptors (i.e., descriptors containing actual data operations). When processing a batch descriptor, DSA fetches the work descriptors from the specified memory and processes them.

Stateless Device:

descriptors in one implementation are designed so that all information required for processing the descriptor comes in the descriptor payload itself. This allows the device to store little client-specific state which improves its scalability. One exception is the completion interrupt message which, when used, is configured by trusted software.

Cache Allocation Control:

this allows applications to specify whether to write to cache or bypass the cache and write directly to memory. In one implementation, completion records are always written to cache.

Shared Work Queue (SWQ) Support:

as described in detail below, some implementations support scalable work submission through Shared Work Queues (SWQ) using the Enqueue Command (ENQCMD) and Enqueue Command as Supervisor (ENQCMDS) instructions. In this implementation, the SWQ is shared by multiple applications. The ENQCMD can be executed from a user (non ring 0) or supervisor (ring 0) privilege levels. The ENQCMDS can be executed from a supervisor (ring 0) privilege level.

Dedicated Work Queue (DWQ) Support:

in some implementations, there is support for high-throughput work submission through Dedicated Work queues (DWQ) using MOVDIR64B instruction. In this implementation the DWQ is dedicated to one particular application.

Qos Support:

some implementations allow a quality of service (QoS) level to be specified for each work queue (e.g., by a Kernel driver). It may then assign different work queues to different applications, allowing the work from different applications to be dispatched from the work queues with different priorities. The work queues can be programmed to use specific channels for fabric QoS.

Biased Cache Coherence Mechanisms

One implementation improves the performance of accelerators with directly attached memory such as stacked DRAM or HBM, and simplifies application development for applications which make use of accelerators with directly attached memory. This implementation allows accelerator attached memory to be mapped as part of system memory, and accessed using Shared Virtual Memory (SVM) technology (such as that used in current IOMMU implementations), but without suffering the typical performance drawbacks associated with full system cache coherence.

The ability to access accelerator attached memory as part of system memory without onerous cache coherence overhead provides a beneficial operating environment for accelerator offload. The ability to access memory as part of the system address map allows host software to setup operands, and access computation results, without the overhead of traditional I/O DMA data copies. Such traditional copies involve driver calls, interrupts and memory mapped I/O (MMIO) accesses that are all inefficient relative to simple memory accesses. At the same time, the ability to access accelerator attached memory without cache coherence overheads can be critical to the execution time of an offloaded computation. In cases with substantial streaming write memory traffic, for example, cache coherence overhead can cut the effective write bandwidth seen by an accelerator in half. The efficiency of operand setup, the efficiency of results access and the efficiency of accelerator computation all play a role in determining how well accelerator offload will work. If the cost of offloading work (e.g., setting up operands; getting results) is too high, offloading may not pay off at all, or may limit the accelerator to only very large jobs. The efficiency with which the accelerator executes a computation can have the same effect.

One implementation applies different memory access and coherence techniques depending on the entity initiating the memory access (e.g., the accelerator, a core, etc.) and the memory being accessed (e.g., host memory or accelerator memory). These techniques are referred to generally as a "Coherence Bias" mechanism which provides for accelerator attached memory two sets of cache coherence flows, one optimized for efficient accelerator access to its attached memory, and a second optimized for host access to accelerator attached memory and shared accelerator/host access to accelerator attached memory. Further, it includes two techniques for switching between these flows, one driven by application software, and another driven by autonomous hardware hints. In both sets of coherence flows, hardware maintains full cache coherence.

Figure 3:
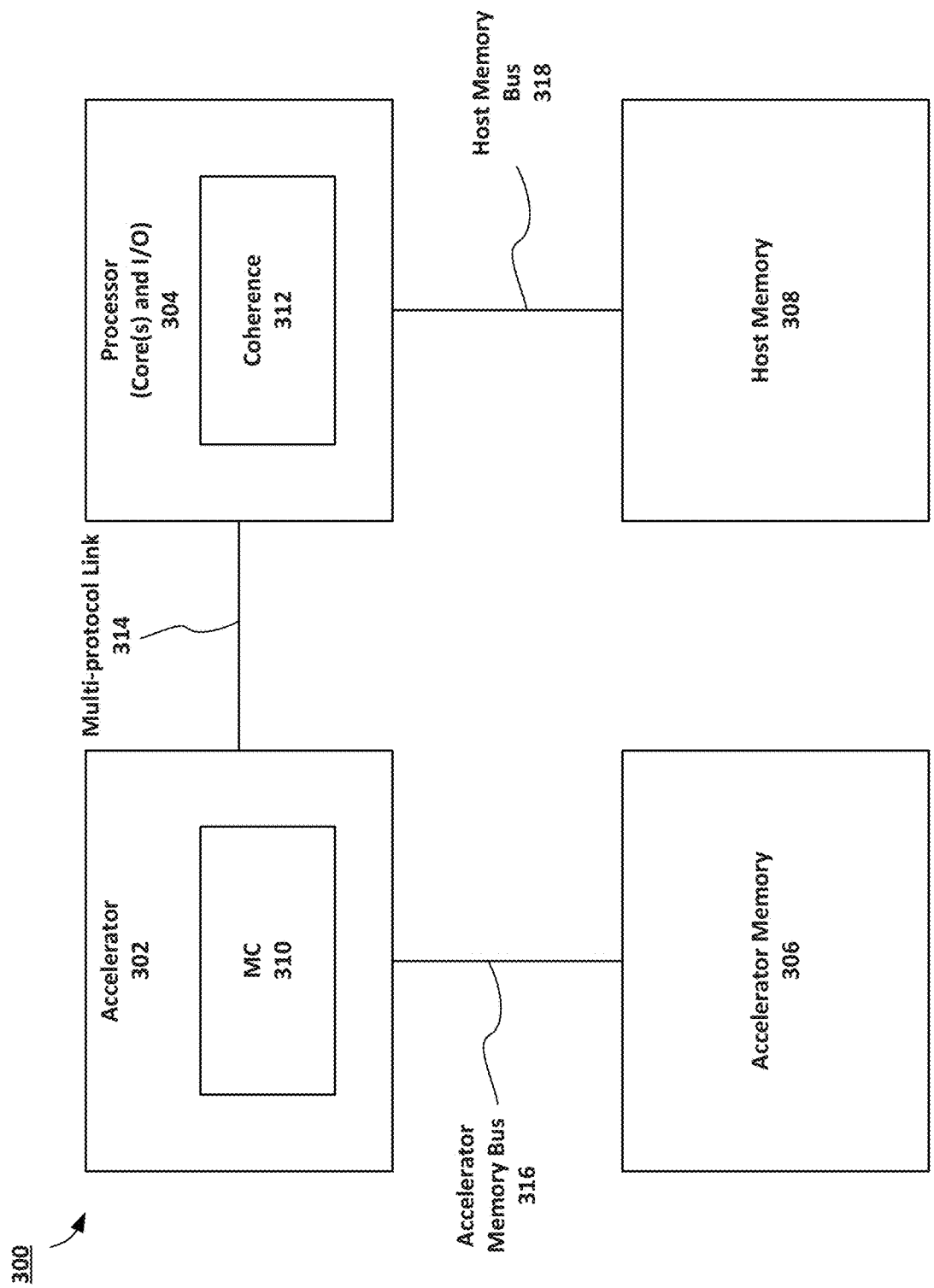
FIG. 3 is a schematic diagram of an example computer system that includes an accelerator and one or more computer processor chips coupled to the processor over a multi-protocol link.

FIG. 3 is a schematic diagram of an example computer system 300 that includes an accelerator and one or more computer processor chips coupled to the processor over a multi-protocol link. As illustrated generally in FIG. 3, one implementation applies to computer systems which include an accelerator 302 and one or more computer processor chips with processor cores and I/O circuitry 304, where the accelerator 302 is coupled to the processor over a multi-protocol link 314. In one implementation, the multi-protocol link 314 is a dynamically multiplexed link supporting a plurality of different protocols including, but not limited to those detailed above. It should be noted, however, that the underlying principles of the invention are not limited to any particular set of protocols. In addition, note that the accelerator 302 and Core I/O 304 may be integrated on the same semiconductor chip or different semiconductor chips, depending on the implementation.

In the illustrated implementation, an accelerator memory bus 316 couples the accelerator 302 to an accelerator memory 306 and a separate host memory bus 318 couples the core I/O 304 to a host memory 308. As mentioned, the accelerator memory 306 may comprise a High Bandwidth Memory (HBM) or a stacked DRAM (some examples of which are described herein) and the host memory 308 may comprise a DRAM such as a Double-Data Rate synchronous dynamic random access memory (e.g., DDR3 SDRAM, DDR4 SDRAM, etc.). However, the underlying principles of the invention are not limited to any particular types of memory or memory protocols.

In one implementation, both the accelerator 302 and "host" software running on the processing cores within the processor chips 304 access the accelerator memory 306 using two distinct sets of protocol flows, referred to as "Host Bias" flows and "Device Bias" flows. As described below, one implementation supports multiple options for modulating and/or choosing the protocol flows for specific memory accesses.

The Coherence Bias flows are implemented, in part, on two protocol layers on the multi-protocol link 314 between the accelerator 302 and one of the processor chips 304: a CAC protocol layer and a MA protocol layer. In one implementation, the Coherence Bias flows are enabled by: (a) using existing opcodes in the CAC protocol in new ways, (b) the addition of new opcodes to an existing MA standard and (c) the addition of support for the MA protocol to a multi-protocol link 302 (prior links include only CAC and PCDI). Note that the multi-protocol link is not limited to supporting just CAC and MA; in one implementation, it is simply required to support at least those protocols.

As used herein, the "Host Bias" flows, illustrated in FIG. 3 are a set of flows that funnel all requests to accelerator memory 306 through the standard coherence controller 312 in the processor chip 304 to which the accelerator 302 is attached, including requests from the accelerator itself. This causes the accelerator 302 to take a circuitous route to access its own memory, but allows accesses from both the accelerator 302 and processor core I/O 304 to be maintained as coherent using the processor's standard coherence controllers 312. In one implementation, the flows use CAC opcodes to issues requests over the multi-protocol link to the processor's coherence controllers 312, in the same or similar manner to the way processor cores 312 issue requests to the coherence controllers 312. For example, the processor chip's coherence controllers 312 may issue UPI and CAC coherence messages (e.g., snoops) that result from requests from the accelerator 302 to all peer processor core chips (e.g., 304) and internal processor agents on the accelerator's behalf, just as they would for requests from a processor core 304. In this manner, coherency is maintained between the data accessed by the accelerator 302 and processor cores I/O 304.

In one implementation, the coherence controllers 312 also conditionally issue memory access messages to the accelerator's memory controller 310 over the multi-protocol link 314. These messages are similar to the messages that the coherence controllers 312 send to the memory controllers that are local to their processor die, and include new opcodes that allow data to be returned directly to an agent internal to the accelerator 302, instead of forcing data to be returned to the processor's coherence controller 312 of the multi-protocol link 314, and then returned to the accelerator 302 as a CAC response over the multi-protocol link 314.

In one implementation of "Host Bias" mode shown in FIG. 3, all requests from processor cores 304 that target accelerator attached memory 306 are sent directly to the processors coherency controllers 312, just as they were they targeting normal host memory 308. The coherence controllers 312 may apply their standard cache coherence algorithms and send their standard cache coherence messages, just as they do for accesses from the accelerator 302, and just as they do for accesses to normal host memory 308. The coherence controllers 312 also conditionally send MA commands over the multi-protocol link 314 for this class of requests, though in this case, the MA flows return data across the multiprotocol link 314.

Figure 4:
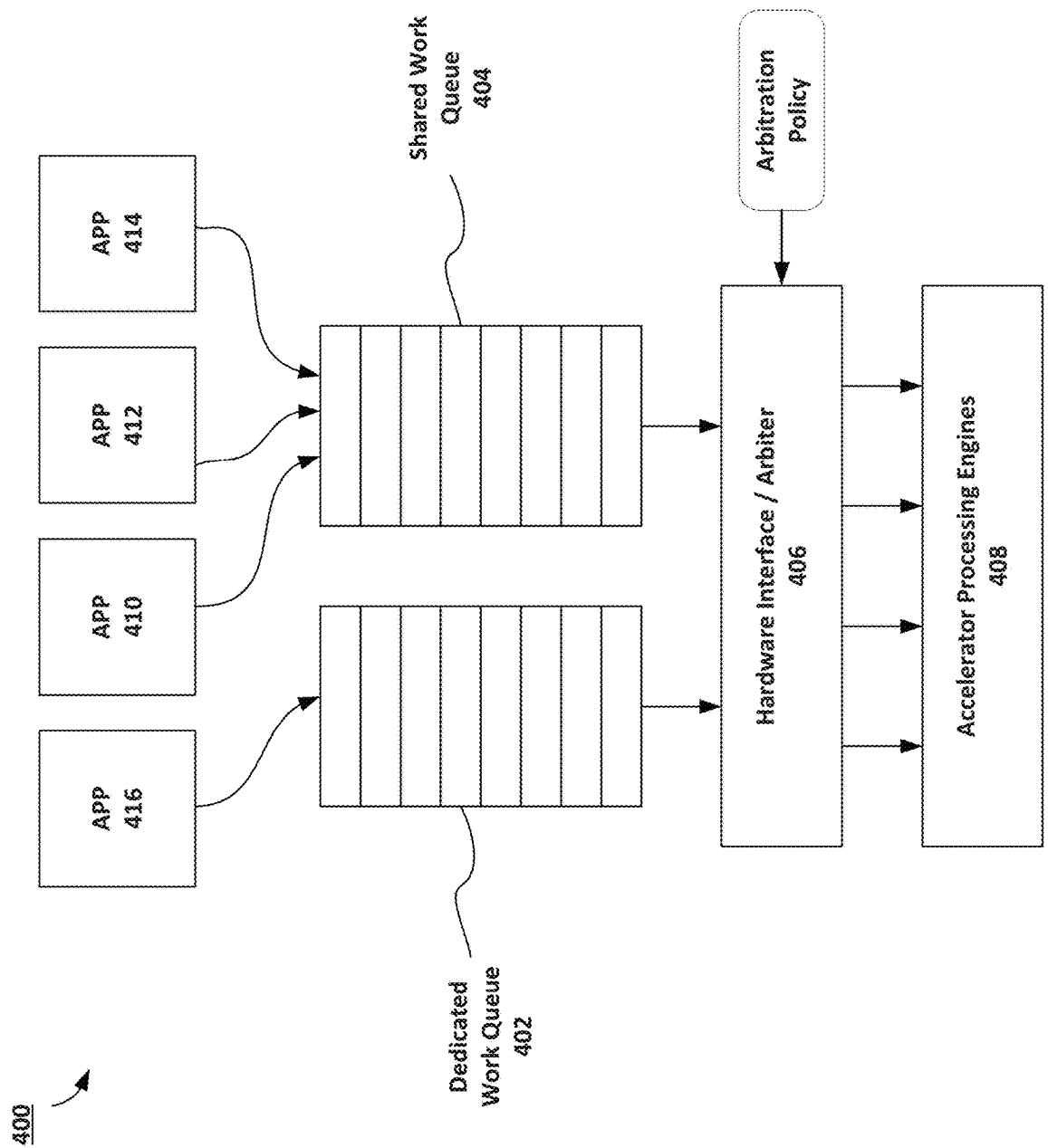
FIG. 4 is a schematic diagram of an example work queue implementation in accordance with embodiments of the present disclosure.

FIG. 4 is a schematic diagram of an example work queue implementation 400 in accordance with embodiments of the present disclosure. In some implementations, Work Queues (WQ) hold "descriptors" submitted by software, arbiters used to implement quality of service (QoS) and fairness policies, processing engines for processing the descriptors, an address translation and caching interface, and a memory read/write interface. Descriptors define the scope of work to be done. As illustrated in FIG. 4, in one implementation, there are two different types of work queues: dedicated work queues 402 and shared work queues 404. Dedicated work queues 402 store descriptors for a single application 416 while shared work queues 404 store descriptors submitted by multiple applications 410-414. A hardware interface/arbiter 406 dispatches descriptors from the work queues 402-404 to the accelerator processing engines 408 in accordance with a specified arbitration policy (e.g., based on the processing requirements of each application 410-416 and QoS/fairness policies).

Shared Work Queue Support on Endpoint Devices

FIG. 4 illustrates the concept of a Shared Work Queue (SWQ), which allows multiple non-cooperating software agents (applications 410-414) to submit work through a shared work queue 404, utilizing the ENQCMD/S instructions described herein.

The following considerations are applicable to endpoint devices implementing Shared Work Queues (SWQ).

SWQs and its enumeration: A device physical function (PF) may support one or more SWQs. Each SWQ is accessible for Enqueue non-posted writes through a 64-byte aligned and sized register (referred here on as SWQ_REG) in the device MMIO address range. Each such SWQ_REG on a device is recommended to be located on a unique system page size (4 KB) region. The device driver for the device is responsible for reporting/enumerating the SWQ capability, the number of SWQs supported and the corresponding SWQ_REG addresses to software through appropriate software interfaces. The driver may also optionally report the depth of the SWQ supported for software tuning or informational purposes (although this is not required for functional correctness). For devices supporting multiple physical functions, it is recommended to support independent SWQs for each physical function.

SWQ support on Single Root I/O Virtualization (SR-IOV) devices: Devices supporting SR-IOV may support independent SWQs for each Virtual Function (VF), exposed through SWQ_REGs in respective VF base address registers (BARs). This design point allows for maximum performance isolation for work submission across VFs, and may be appropriate for a small to moderate number of VFs. For devices supporting large number of VFs (where independent SWQ per VF is not practical), a single SWQ may be shared across multiple VFs. Even in this case, each VF has its own private SWQ_REGs in its VF BARs, except they are backed by a common SWQ across the VFs sharing the SWQ. For such device designs, which VFs share a SWQ may be decided statically by the hardware design, or the mapping between a given VF's SWQ_REG to SWQ instance may be dynamically setup/torn-down through the Physical Function and its driver. Device designs sharing SWQ across VFs need to pay special attention to QoS and protection against denial of service attacks as described later in this section. When sharing SWQs across VFs, care must be taken in the device design to identify which VF received an Enqueue request accepted to SWQ. When dispatching the work requests from the SWQ, the device should make sure upstream requests are properly tagged with the Requester-ID (Bus/Device/Function #) of the respective VF (in addition to the PASID that was conveyed in the Enqueue request payload).

Enqueue non-posted write address: Endpoint devices supporting SWQs are required to accept Enqueue non-posted writes to any addresses routed through their PF or VF memory BARs. For any Enqueue non-posted write request received by an endpoint device to an address that is not an SWQ_REG address, the device may be required to not treat this as an error (e.g., Malformed TLP, etc.) and instead return completion with a completion status of Retry (MRS). This may be done to ensure unprivileged (ring-3 or ring-0 VMX guest) software use of ENQCMD/S instructions to erroneously or maliciously issue Enqueue-stores to a non SWQ_REG addresses on a SWQ-capable device cannot result in non-fatal or fatal error reporting with platform-specific error handling consequences.

Non-Enqueue Request handling to SWQ_REGs: Endpoint devices supporting SWQs may silently drop non-Enqueue requests (normal memory writes and reads) to the SWQ_REG addresses without treating them as fatal or non-fatal errors. Read requests to the SWQ_REG addresses may return a successful completion response (as opposed to UR or CA) with a value of all is for the requested data bytes. Normal memory (posted) write requests to SWQ_REG addresses are simply dropped without action by the endpoint device. This may be done to ensure unprivileged software cannot generate normal read and write requests to the SWQ_REG address to erroneously or maliciously cause non-fatal or fatal error reporting with platform-specific error handling consequences.

SWQ queue depth and storage: SWQ queue depth and storage is device implementation specific. Device designs should ensure sufficient queue depth is supported for the SWQ to achieve maximum utilization of the device. Storage for the SWQ may be implemented on the device. Integrated devices on the SoC may utilize stolen main memory (non-OS visible private memory reserved for device use) as a spill buffer for the SWQ allowing for larger SWQ queue-depths than possible with on-device storage. For such designs, the use of a spill buffer is transparent to software, with device hardware deciding when to spill (versus drop the Enqueue request and send a Retry completion status), fetch from the spill buffer for command execution, and maintain any command-specific ordering requirements. For all purposes, such spill buffer usage is equivalent to a discrete device using local device-attached DRAM for SWQ storage. Device designs with a spill buffer in stolen memory must take extreme care to make sure that such stolen memory is protected from any accesses other than spill buffer read and writes by the device for which it is allocated for.

Non-blocking SWQ behavior: For performance reasons, device implementations should respond quickly to Enqueue non-posted write requests with Success or Retry completion status, and not block Enqueue completions for SWQ capacity to be freed-up to accept the request. The decision to accept or reject an Enqueue request to the SWQ could be based on capacity, QoS/occupancy or any other policies. Some example QoS considerations are described next.

SWQ QoS considerations: For an Enqueue non-posted write targeting a SWQ_REG address, the endpoint device may apply admission control to decide to accept the request to the respective SWQ (and send a successful completion status) or drop it (and send a Retry completion status). The admission control may be device and usage specific, and the specific policies supported/enforced by hardware may be exposed to software through the Physical Function (PF) driver interfaces. Because the SWQ is a shared resource with multiple producer clients, device implementations must ensure adequate protection against denial-of-service attacks across producers. QoS for SWQ refers only to acceptance of work requests (through enqueue requests) to the SWQ, and is orthogonal to any QoS applied by the device hardware on how QoS is applied to share the execution resources of the device when processing work requests submitted by different producers. Some example approaches are described below for configuring endpoint devices to enforce admission policies for accepting Enqueue requests to SWQ. These are documented for illustration purposes only and the exact implementation choices will be device specific.

These CPU instructions produce an atomic non-posted write transaction (a write transaction for which a completion response is returned back to the CPU). The non-posted write transaction is address routed like any normal MMIO write to the target device. The non-posted write transaction carries with it the following information:

a. Identity of the address space of the client that executed this instruction. For this disclosure, we use the "Process Address Space Identifier" (PASID) as the client address-space identity. Depending on the software usage, PASID can be used for any of the type of clients (process, container, VM, etc.). It is possible for other implementation of this invention to use different identification schemes. ENQCMD instruction use the PASID associated with the current software thread (something the OS is expected to save/restore using XSAVES/XRSTORS instructions on thread context switches). ENQCMDS instruction allows the privileged software executing this instruction to specify the PASID as part of the source operand for ENQCMDS instruction.

b. Privilege (supervisor or user) of the client that executed this instruction. Execution of ENQCMD always indicates user permission. ENQCMDS allows supervisor-mode software executing it to specify either user privilege (if it is executing it on behalf of some ring-3 client), or supervisor privilege (to indicate the command is from kernel mode client) as part of the source operand for ENQCMDS instruction.

c. Command Payload that is specific to the target device. The command payload is read from the source operand and conveyed as is by the instruction in the non-posted write payload. Depending on the device, the device may use ENQCMD/S in different way. For example, some devices may treat it as a doorbell command where the payload specifies the actual work descriptor in memory to fetch from). Other devices may use the actual ENQ command to carry the device specific work descriptor, thus avoiding the latency/overhead for reading the work descriptors from main memory.

The SWQ on a device processes a non-posted write request received as follows:

At the ingress of device SWQ check if there is space in the SWQ to accept the request. If there is no space, drop the request and return a completion indicating "Reject/Retry" in completion status.

If there is space to accept command to the SWQ perform any needed device-specific admission control based on the attributes in the request (such as PASID, Privilege, or SWQ_PREG address to which the request is routed) and various device-specific QoS settings for specific clients. If the admission control method determines that the request cannot be accepted to the SWQ the request is dropped and a completion is returned with a completion status of "Reject/Retry".

If the above checks result in the non-posted write command to be accepted to the SWQ, a completion is returned with completion status of "Successful Completion". The command queued to the SWQ is processed/dispatched based on the device-specific scheduling model internal to the device.

When the work specified by the command is completed, the device generates appropriate synchronization or notification transactions to inform the client about work completions. These could be through memory writes, interrupt writes, or other methods.

The ENQCMD and ENQCMDS instruction blocks until the completion response is received back by the CPU. The instruction returns the status (success v/s reject/retry) in the EFLAGS.ZF flag before the instruction retires.

Software may queue work through SWQ as follows:

a. Map the SWQ_PREG of the device to client's CPU virtual address space (user or kernel virtual address, depending of if the client is user-mode or runs in kernel-mode). This is similar to memory-mapping any MMIO resources on a device.

b. Format descriptor in memory c. Execute ENQCMD/S with the memory virtual address of descriptor as source and the virtual address to which the SWQ_PREG is mapped as the destination.

d. Execute a condition jump (JZ) to check if the ENQCMD/S instruction returned success or retry. If retry status, either retry from step-C (with appropriate back An ENQ non-posted write may be dropped by any agent (uncore, coherent fabric, I/O fabric, bridges, . . . ) between the CPU and the device. If any agent drops an ENQ request, such agent must return a completion response with retry status code. Software sees and treats it just like a retry response it received from the target SWQ at the device. This is possible because, ENQ* requests are self-contained and do not have any ordering constraints associated with them. System designs and fabrics may make use of this property to handle temporal congestion or back-pressure conditions in hardware/fabrics.

This property may also be utilized to build optimized designs where the SWQ may be moved closer to the CPU and use a dedicated posted/credit-based method to forward accepted commands to the SWQ to the target device. Such approaches may be useful to improve the round-trip latency of ENQ instruction which otherwise is required to send the non-posted write request all the way to the SWQ on device and wait for completion.

The SWQ could be implemented on a device by making use of either dedicated storage on-chip (SRAM), or using extended memory (DRAM) on the device or even reserved/stolen memory in the platform. In these cases, the SWQ is just a front end for the clients to submit work using non-posted semantics, and all accepted commands to a SWQ are written to an in-memory work-queue by the device, from which the various execution of the engines can fetch work just like any normal memory-based work-queue. Such memory-backed SWQ implementation can allow for a large SWQ capacity than what may be otherwise possible with dedicated on-chip SRAM storage.

Figure 5:
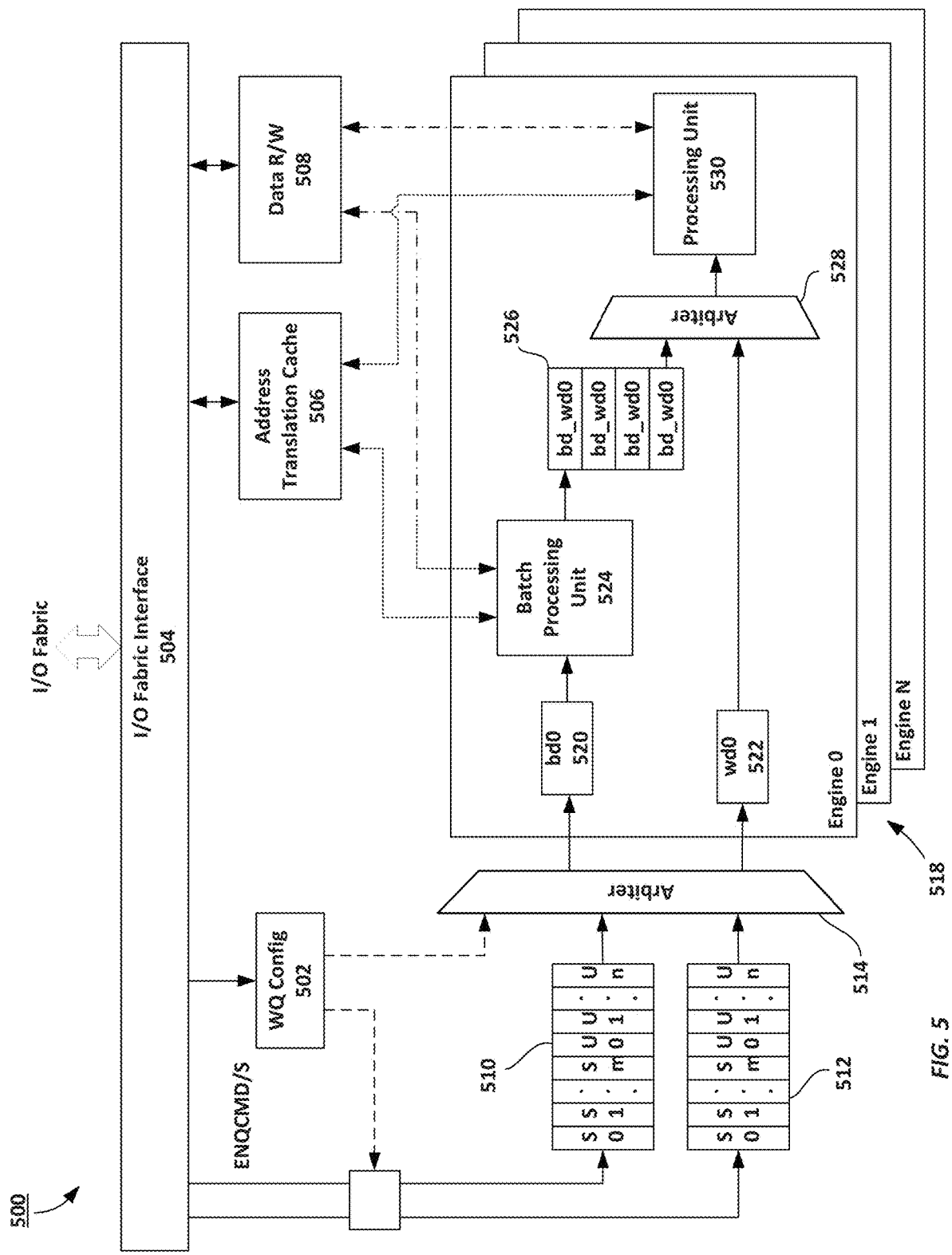
FIG. 5 is a schematic diagram of an example data streaming accelerator (DSA) device comprising multiple work queues that receive descriptors submitted over an I/O fabric interface.

FIG. 5 is a schematic diagram of an example data streaming accelerator (DSA) device comprising multiple work queues that receive descriptors submitted over an I/O fabric interface. FIG. 5 illustrates one implementation of a data streaming accelerator (DSA) device comprising multiple work queues 510-512 which receive descriptors submitted over an I/O fabric interface 504 (e.g., such as the multi-protocol link 314 described above). DSA uses the I/O fabric interface 504 for receiving downstream work requests from clients (such as processor cores, peer input/output (IO) agents (such as a network interface controller (NIC)), and/or software chained offload requests) and for upstream read, write, and address translation operations. The illustrated implementation includes an arbiter 514 which arbitrates between the work queues and dispatches a work descriptor to one of a plurality of engines 518. The operation of the arbiter 514 and work queues 510-512 may be configured through a work queue configuration register 502. For example, the arbiter 514 may be configured to implement various QoS and/or fairness policies for dispatching descriptors from each of the work queues 510-512 to each of the engines 518.

In one implementation, some of the descriptors queued in the work queues 510-512 are batch descriptors 520 which contain/identify a batch of work descriptors. The arbiter 514 forwards batch descriptors to a batch processing unit 524 which processes batch descriptors by reading the array of descriptors 526 from memory, using addresses translated through translation cache 506 (or potentially other address translation services on the processor). Once the physical address has been identified data read/write circuit 508 reads the batch of descriptors from memory.

A second arbiter 528 arbitrates between batches of work descriptors 526 provided by the batch processing unit 524 and individual work descriptors 522 retrieved from the work queues 510-512 and outputs the work descriptors to a work descriptor processing unit 530. In one implementation, the work descriptor processing unit 530 has stages to read memory (via data R/W unit 508), perform the requested operation on the data, generate output data, and write output data (via data R/W unit 508), completion records, and interrupt messages.

In one implementation, the work queue configuration allows software to configure each WQ (via a WQ configuration register 502) either as a Shared Work Queue (SWQ) that receives descriptors using non-posted ENQCMD/S instructions or as a Dedicated Work Queue (DWQ) that receives descriptors using posted MOVDIR64B instructions. As mentioned above with respect to FIG. 4, a DWQ may process work descriptors and batch descriptors submitted from a single application whereas a SWQ may be shared among multiple applications. The WQ configuration register 502 also allows software to control which WQs 510-512 feed into which accelerator engines 518 and the relative priorities of the WQs 510-512 feeding each engine. For example, an ordered set of priorities may be specified (e.g., high, medium, low; 1, 2, 3, etc.) and descriptors may generally be dispatched from higher priority work queues ahead of or more frequently than dispatches from lower priority work queues. For example, with two work queues, identified as high priority and low priority, for every 10 descriptors to be dispatched, 8 out of the 10 descriptors may be dispatched from the high priority work queue while 2 out of the 10 descriptors are dispatched from the low priority work queue. Various other techniques may be used for achieving different priority levels between the work queues 510-512.

In one implementation, the data streaming accelerator (DSA) is software compatible with a PCI Express configuration mechanism and implements a PCI header and extended space in its configuration-mapped register set. The configuration registers can be programmed through CFC/CF8 or MMCFG from the Root Complex. All the internal registers may be accessible through the JTAG or SMBus interfaces as well.

In one implementation, the DSA device uses memory-mapped registers for controlling its operation. Capability, configuration, and work submission registers (portals) are accessible through the MMIO regions defined by BAR0, BAR2, and BAR4 registers (described below). Each portal may be on a separate 4K page so that they may be independently mapped into different address spaces (clients) using processor page tables.

As mentioned, software specifies work for DSA through descriptors. Descriptors specify the type of operation for DSA to perform, addresses of data and status buffers, immediate operands, completion attributes, etc. (additional details for the descriptor format and details are set forth below). The completion attributes specify the address to which to write the completion record, and the information needed to generate an optional completion interrupt.

In one implementation, DSA avoids maintaining client-specific state on the device. All information to process a descriptor comes in the descriptor itself. This improves its shareability among user-mode applications as well as among different virtual machines (or machine containers) in a virtualized system.

A descriptor may contain an operation and associated parameters (called a Work descriptor), or it can contain the address of an array of work descriptors (called a Batch descriptor). Software prepares the descriptor in memory and submits the descriptor to a Work Queue (WQ) 510-512 of the device. The descriptor is submitted to the device using a MOVDIR64B, ENQCMD, or ENQCMDS instruction depending on WQ's mode and client's privilege level.

Each WQ 510-512 has a fixed number of slots and hence can become full under heavy load. In one implementation, the device provides the required feedback to help software implement flow control. The device dispatches descriptors from the work queues 510-512 and submits them to the engines for further processing. When the engine 518 completes a descriptor or encounters certain faults or errors that result in an abort, it notifies the host software by either writing to a completion record in host memory, issuing an interrupt, or both.

In one implementation, each work queue is accessible via multiple registers, each in a separate 4 KB page in device MMIO space. One work submission register for each WQ is called "Non-privileged Portal" and is mapped into user space to be used by user-mode clients. Another work submission register is called "Privileged Portal" and is used by the kernel-mode driver. The rest are Guest Portals, and are used by kernel-mode clients in virtual machines.

As mentioned, each work queue 510-512 can be configured to run in one of two modes, Dedicated or Shared. DSA exposes capability bits in the Work Queue Capability register to indicate support for Dedicated and Shared modes. It also exposes a control in the Work Queue Configuration registers 502 to configure each WQ to operate in one of the modes. The mode of a WQ can only be changed while the WQ is disabled i.e., (WQCFG.Enabled=0). Additional details of the WQ Capability Register and the WQ Configuration Registers are set forth below.

In one implementation, in shared mode, a DSA client uses the ENQCMD or ENQCMDS instructions to submit descriptors to the work queue. ENQCMD and ENQCMDS use a 64-byte non-posted write and wait for a response from the device before completing. The DSA returns a "success" (e.g., to the requesting client/application) if there is space in the work queue, or a "retry" if the work queue is full. The ENQCMD and ENQCMDS instructions may return the status of the command submission in a zero flag (0 indicates Success, and 1 indicates Retry). Using the ENQCMD and ENQCMDS instructions, multiple clients can directly and simultaneously submit descriptors to the same work queue. Since the device provides this feedback, the clients can tell whether their descriptors were accepted.

In shared mode, DSA may reserve some SWQ capacity for submissions via the Privileged Portal for kernel-mode clients. Work submission via the Non-Privileged Portal is accepted until the number of descriptors in the SWQ reaches the threshold configured for the SWQ. Work submission via the Privileged Portal is accepted until the SWQ is full. Work submission via the Guest Portals is limited by the threshold in the same way as the Non-Privileged Portal.

If the ENQCMD or ENQCMDS instruction returns "success," the descriptor has been accepted by the device and queued for processing. If the instruction returns "retry," software can either try re-submitting the descriptor to the SWQ, or if it was a user-mode client using the Non-Privileged Portal, it can request the kernel-mode driver to submit the descriptor on its behalf using the Privileged Portal. This helps avoid denial of service and provides forward progress guarantees. Alternatively, software may use other methods (e.g., using the CPU to perform the work) if the SWQ is full.

Clients/applications are identified by the device using a 20-bit ID called process address space ID (PASID). The PASID is used by the device to look up addresses in the Device TLB 1722 and to send address translation or page requests to the IOMMU 1710 (e.g., over the multi-protocol link 2800). In Shared mode, the PASID to be used with each descriptor is contained in the PASID field of the descriptor. In one implementation, ENQCMD copies the PASID of the current thread from a particular register (e.g., PASID MSR) into the descriptor while ENQCMDS allows supervisor mode software to copy the PASID into the descriptor.

Although dedicated mode does not share of a single DWQ by multiple clients/applications, a DSA device can be configured to have multiple DWQs and each of the DWQs can be independently assigned to clients. In addition, DWQs can be configured to have the same or different QoS levels to provided different performance levels for different clients/applications.

In one implementation, a data streaming accelerator (DSA) contains two or more engines 518 that process the descriptors submitted to work queues 510-512. One implementation of the DSA architecture includes 4 engines, numbered 0 through 3. Engines 0 and 1 are each able to utilize up to the full bandwidth of the device (e.g., 30 GB/s for reads and 30 GB/s for writes). The combined bandwidth of all engines is also limited to the maximum bandwidth available to the device.

In one implementation, software configures WQs 510-512 and engines 518 into groups using the Group Configuration Registers. Each group contains one or more WQs and one or more engines. The DSA may use any engine in a group to process a descriptor posted to any WQ in the group and each WQ and each engine may be in only one group. The number of groups may be the same as the number of engines, so each engine can be in a separate group, but not all groups need to be used if any group contains more than one engine.

Although the DSA architecture allows great flexibility in configuring work queues, groups, and engines, the hardware may be narrowly designed for use in specific configurations. Engines 0 and 1 are may be configured in one of two different ways, depending on software requirements. One recommended configuration is to place both engines 0 and 1 in the same group. Hardware uses either engine to process descriptors from any work queue in the group. In this configuration, if one engine has a stall due to a high-latency memory address translation or page fault, the other engine can continue to operate and maximize the throughput of the overall device.

Figure 6A:
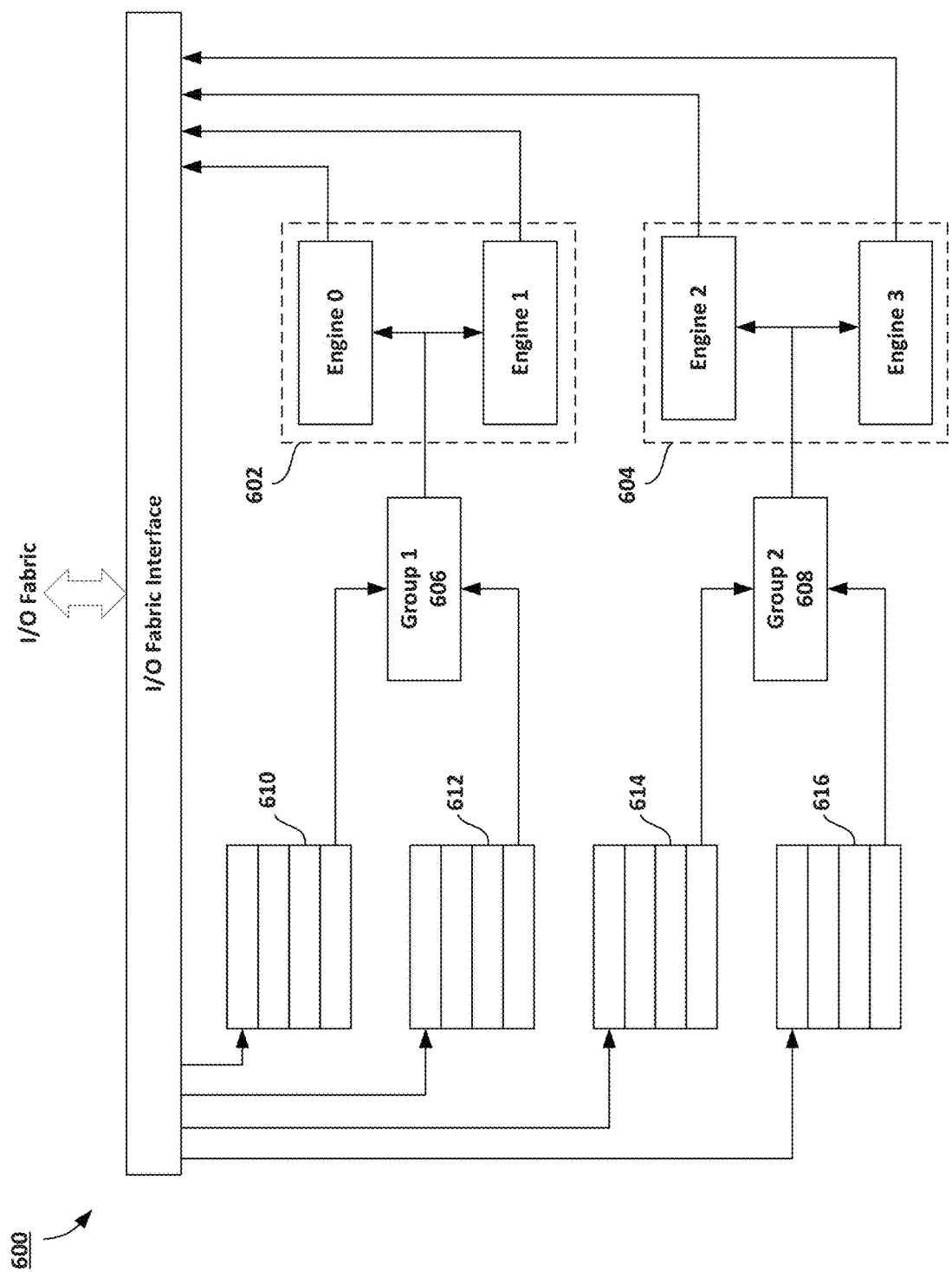
FIGS. 6A-B are schematic diagrams illustrating example shared work queue implementation scenarios in accordance with embodiments of the present disclosure.
Figure 6B:
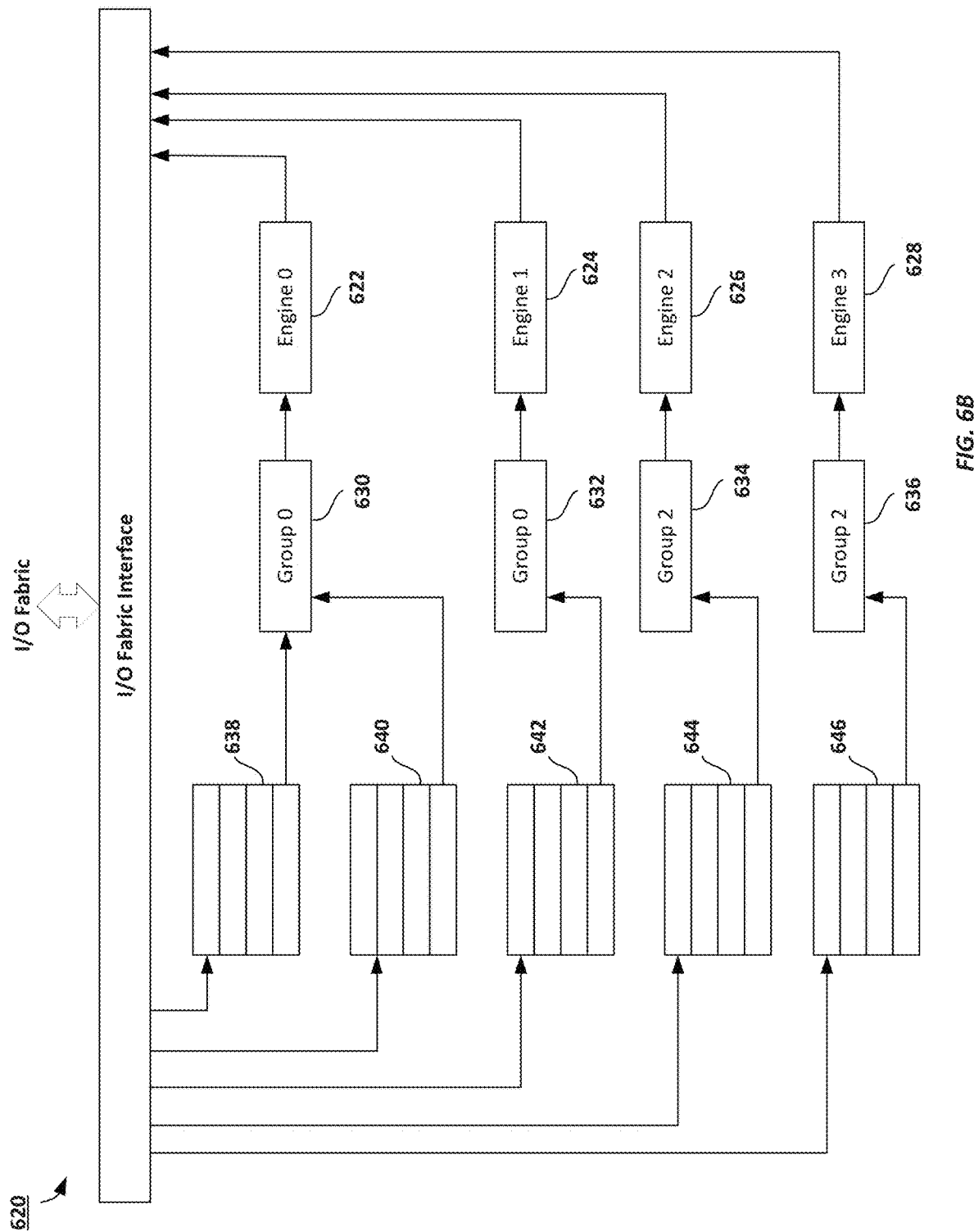

FIGS. 6A-B are schematic diagrams illustrating an example DMWr request scenario in accordance with embodiments of the present disclosure. FIGS. 6A-B are schematic diagrams illustrating example DMWr request scenarios in accordance with embodiments of the present disclosure. FIG. 6A shows a system 600 that includes two work queues 610-612 and 614-616 in each group 606 and 608, respectively, but there may be any number up to the maximum number of WQs supported. The WQs in a group may be shared WQs with different priorities, or one shared WQ and the others dedicated WQs, or multiple dedicated WQs with the same or different priorities. In the illustrated example, group 606 is serviced by engines 0 and 1 602 and group 608 is serviced by engines 2 and 3 604. Engines 0, 1, 2, and 3 can be similar to engine 518.

As illustrated in FIG. 6B, another system 620 using engines 0 622 and 1 624 is to place them in separate groups 630 and 632, respectively. Similarly, group 2 634 is assigned to engine 2 626 and group 3 is assigned to engine 3 628. In addition, group 0 630 is comprised of two work queues 638 and 640; group 1 632 is comprised of work queue 642; work queue 2 634 is comprised of work queue 644; and group 3 636 is comprised of work queue 646.

Software may choose this configuration when it wants to reduce the likelihood that latency-sensitive operations become blocked behind other operations. In this configuration, software submits latency-sensitive operations to the work queue 642 connected to engine 1 626, and other operations to the work queues 638-640 connected to engine 0 622.

Engine 2 626 and engine 3 628 may be used, for example, for writing to a high bandwidth non-volatile memory such as phase-change memory. The bandwidth capability of these engines may be sized to match the expected write bandwidth of this type of memory. For this usage, bits 2 and 3 of the Engine Configuration register should be set to 1, indicating that Virtual Channel 1 (VC1) should be used for traffic from these engines.

In a platform with no high bandwidth, non-volatile memory (e.g., phase-change memory) or when the DSA device is not used to write to this type of memory, engines 2 and 3 may be unused. However, it is possible for software to make use of them as additional low-latency paths, provided that operations submitted are tolerant of the limited bandwidth.

As each descriptor reaches the head of the work queue, it may be removed by the scheduler/arbiter 514 and forwarded to one of the engines in the group. For a Batch descriptor 520, which refers to work descriptors 526 in memory, the engine fetches the array of work descriptors from memory (i.e., using batch processing unit 524).

In one implementation, for each work descriptor 522, the engine 518 pre-fetches the translation for the completion record address and passes the operation to the work descriptor processing unit 530. The work descriptor processing unit 530 uses the Device TLB and IOMMU for source and destination address translations, reads source data, performs the specified operation, and writes the destination data back to memory. When the operation is complete, the engine writes the completion record to the pre-translated completion address and generates an interrupt, if requested by the work descriptor.

In one implementation, DSA's multiple work queues can be used to provide multiple levels of quality of service (QoS). The priority of each WQ may be specified in the WQ configuration register 502. The priorities of WQs are relative to other WQs in the same group (e.g., there is no meaning to the priority level of a WQ that is in a group by itself). Work queues in a group may have the same or different priorities. However, there is no point in configuring multiple shared WQs with the same priority in the same group, since a single SWQ would serve the same purpose. The scheduler/arbiter 514 dispatches work descriptors from work queues 510-512 to the engines 518 according to their priority.

Accelerator devices and high-performance I/O devices support servicing requests directly from multiple clients. In this context, the term client (also referred to herein as entities) can include any of the following:

Multiple user-mode (ring 3) applications that are submitting direct user-mode I/O requests to the device;

Multiple kernel-mode (ring 0) drivers running in multiple virtual machines (VMs) sharing the same device;

Multiple software agents running in multiple containers (with OS supporting container technologies);

Any combination of above (e.g., ring 3 applications inside a VM, containers hardened by running them in a VM, etc.);

Peer I/O agents submitting work directly for efficient inline acceleration (e.g., a NIC device using a crypto-device for encryption acceleration, or a touch controller or image processing unit using the GPU for advanced sensor processing); or Host software chaining offload requests across accelerators, where an accelerator device may forward work to another host software specified accelerator to chain work without bouncing through the host (e.g., a compression accelerator compressing first, before chaining work to a bulk crypto-accelerator for encryption on the compressed data).

The term "directly" above implies the device is shared with multiple clients without intermediate software layers, such as with common kernel drivers in case of user applications, or common VMM/hypervisor layers in case of VMs) in the control and data path to minimize software overhead.

Examples of multi-client accelerator/high-performance devices can include programmable GPUs, configurable offload devices, reconfigurable offload devices, fixed-function offload devices, high-performance host fabric controller devices, or high-performance I/O devices.

Work-submission scalability can be addressed by using the shared work queues, as described above. This disclosure describes mechanisms to apply shared work queues and achieve work submission scalability using interconnect protocols based on the PCIe specification.

This disclosure describes a PCIe packet type, referred to herein as an "Deferred Memory Write Request" (DMWr). In embodiments, the term Acknowledged Memory Write (AMWr) requests is used, and it is understood that the concepts are similar. DMWr packets can include the following features and functions:

DMWr packets are Non-Posted transactions, and as such are handled differently than Posted MWr packets by PCIe flow control;

Being Non-Posted transactions, DMWr transactions require a Completion to be sent back to the Requester; and Unlike MWr transactions (where the Completer must accept all properly formatted Requests), DMWr Completers may choose to accept or decline the AMWr Request for any implementation-specific reason.

FIGS. 7A-D are schematic diagrams illustrating an example acknowledged memory write (DMWr) request and response message flow in accordance with embodiments of the present disclosure. In general, the I/O device (such as the accelerator device) supports a common command interface for work submissions from its clients. The common command interface can be referred to as a shared work queue (SWQ). In FIGS. 7A-D, the SWQ is shown as command queue 704. The SWQ can be a command queue 704 implemented on the accelerator device. The depth of the command queue 704 is implementation-specific and can be sized based on the number of outstanding commands required to feed the device to achieve its full throughput potential.

An accelerator 702 with a fixed-length FIFO command queue 704 can receive uncoordinated commands directly from multiple software (or hardware) entities (e.g., entity A and entity B in the examples below). Each entity can issue commands (such as work descriptors) by issuing AMWr Requests to a single fixed memory address. Note that each entity can issue these commands directly to the device without the need for any sort of coordination mechanism between the other entities issuing commands.

Figure 7A:
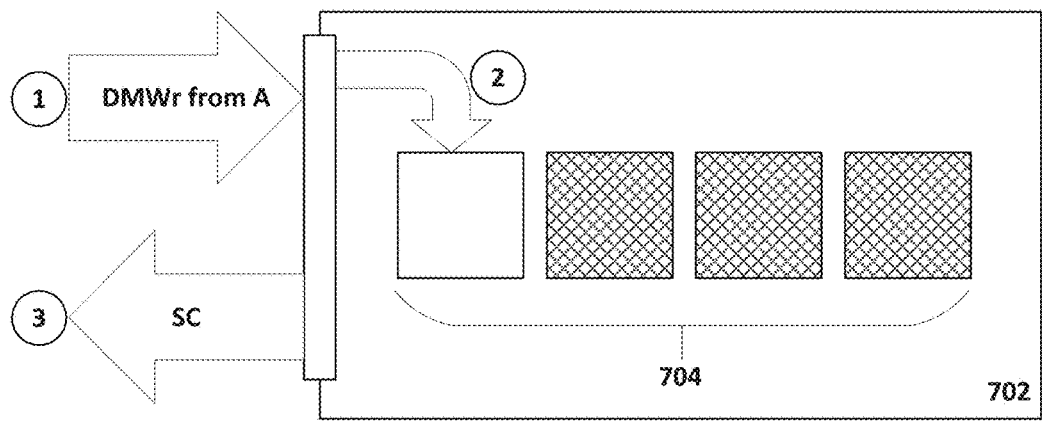
FIGS. 7A-D are schematic diagrams illustrating an example deferred memory write (DMWr) request and response message flow in accordance with embodiments of the present disclosure.

In the example shown in FIG. 7A, accelerator command queue 704 is nearly full. 1) Entity A issues a command to the queue 704 via an DMWr Packet. 2) The accelerator can accept the command into the command queue. 3) The accelerator 702 can respond with a Successful Completion (SC). Note that such a device may also choose to decline packets before the queue is completely full for implementation-specific reasons (e.g., to implement TCP-like flow control mechanism).

Figure 7B:
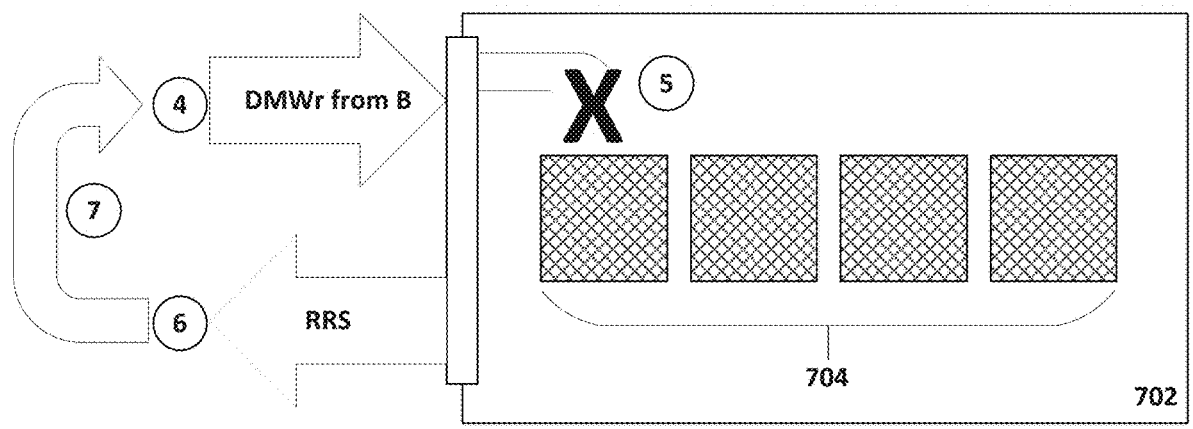

In FIG. 7B, the command queue 704 is full. 4) Entity B issues command to the command queue 704 while the command queue 704 is full. 5) The accelerator 702 declines the request, and 6) the accelerator 702 sends a Completion with Request Retry Status (RRS). 7) If entity B attempts to reissue the command while the queue is still fill, the accelerator 702 can continue to send associated Completions with RRS in the status field.

Figure 7C:
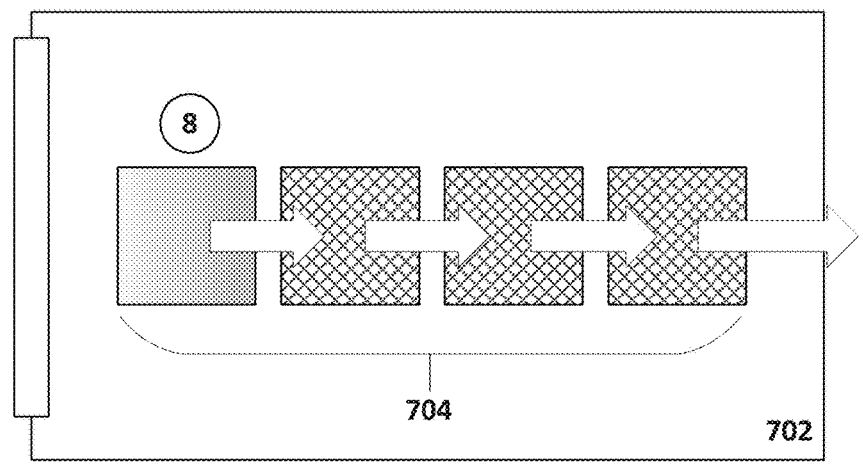
Figure 7D:
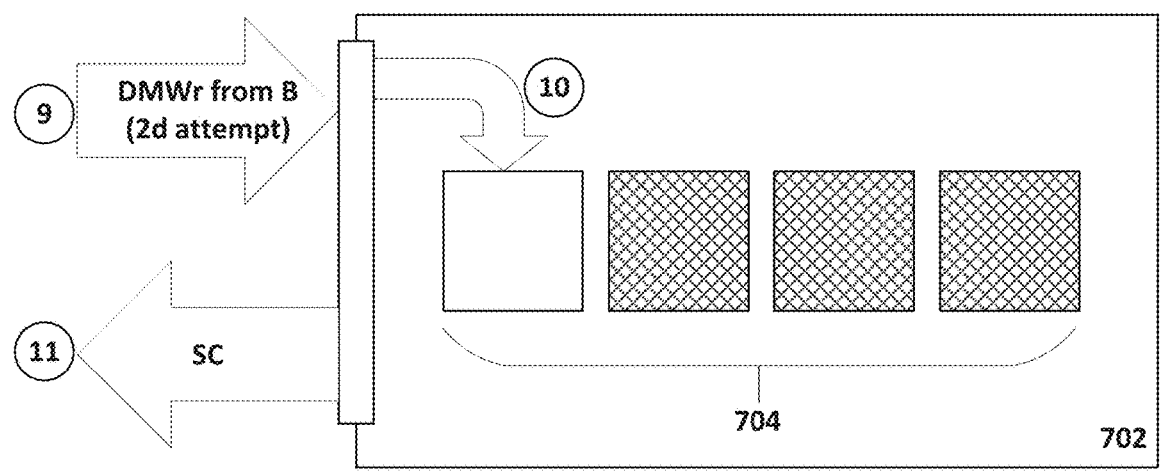
Figure 8:
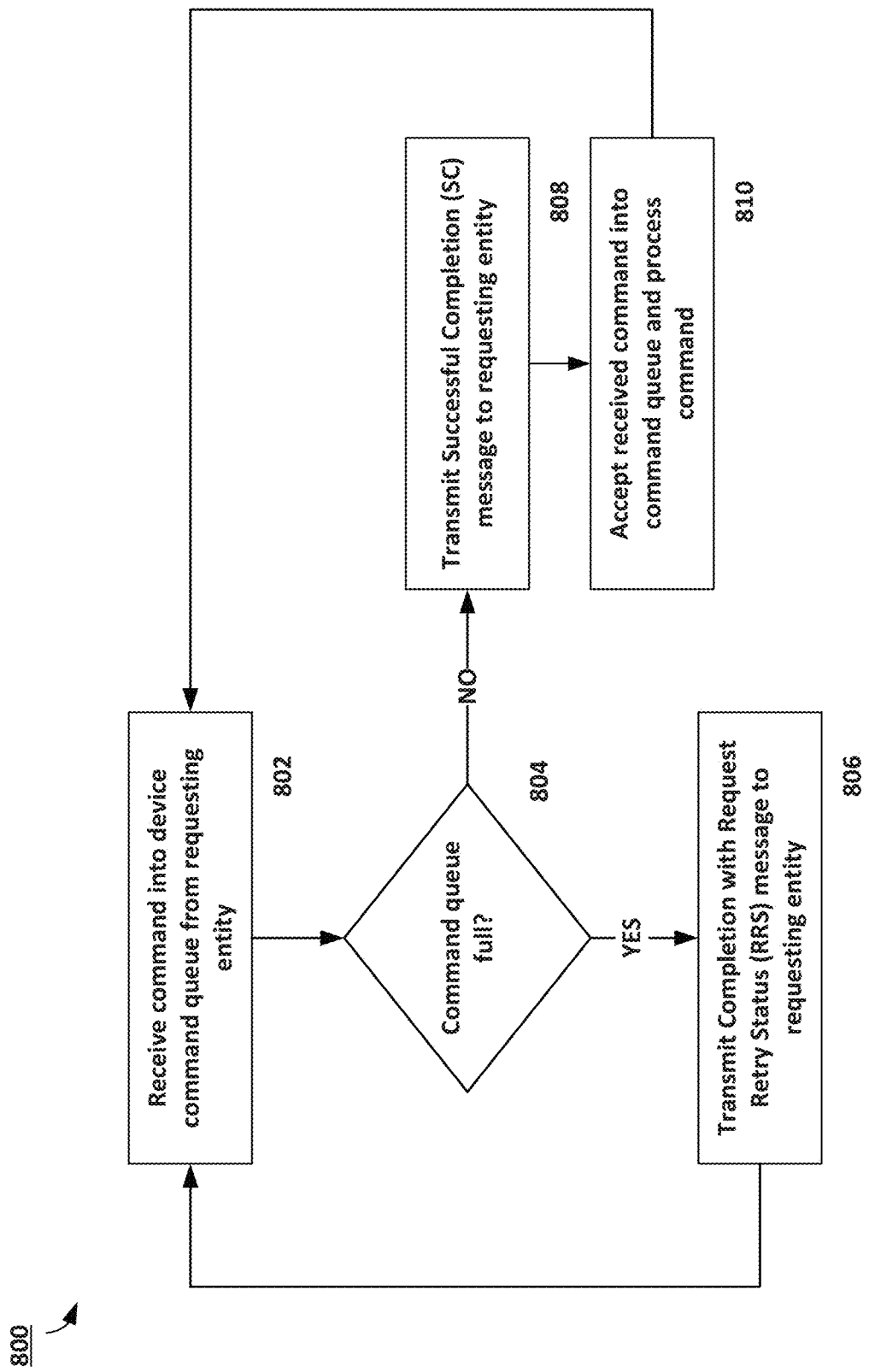
FIG. 8 is a process flow diagram for performing scalable work submissions in accordance with embodiments of the present disclosure.

In FIG. 7C, 8) the accelerator 702 completes processing a command and space becomes available on its queue. In FIG. 7D, 9) Entity B (or any other entity) reissues a command to the accelerator 702. 10) Accelerator 702 can now accept the command into command queue 704. 11) Accelerator 702 can respond with a Successful Completion (SC) message.

FIG. 8 is a process flow diagram 800 for performing scalable work submissions in accordance with embodiments of the present disclosure. At the outset, an I/O device, such as an accelerator, can receive from an entity a command into its command queue (802). If the command queue if full (804), then the accelerator can transmit a Completion with Request Retry Status (RRS) message to the entity (806). If the command queue is not full (804), then the accelerator can transmit a Successful Completion (SC) message to the entity (808) and can accept the command into the command for processing (810).

Deferred Memory Write (DMWr):

In some embodiments, a DMWr can be used to send data over PCIe. Deferrable Memory Writes require the Completer to return an acknowledgement to the Requester, and provides a mechanism for the recipient to defer the received data. The DMWr TLP facilitates use-cases that were previously not possible (or much more difficult to implement) on PCIe-based devices and links. DMWr provides a mechanism for Endpoints and hosts to choose to carry out or defer incoming DMWr Requests. This mechanism can be used by Endpoints and Hosts to simplify the design of flow control and fixed-length queue mechanisms. With DMWr, devices can have a single shared work queue and accept work items from multiple non-cooperating software agents in a non-blocking way. A DMWr can be defined as a memory write where the Requester attempts to write to a given location in Memory Space. The Completer can accept or decline this write by returning a completion with status of SC or memory request retry status (MRS), respectively (similar to the RRS above).

The Deferrable Memory Write (DMWr) is an Optional Non-Posted Request that enables a scalable high-performance mechanism to implement shared work queues and similar capabilities. With DMWr, devices can have a single shared work queue and accept work items from multiple non-cooperating software agents in a non-blocking way.

The following requirements apply to DMWr Completers (a completer can be any entity that completes a non-posted write request transaction):

Completers supporting DMWr Requests handle properly-formatted DMWr Requests as a Successful Completion (SC), Request Retry Status (MRS), Unsupported Request (UR), or Completer Abort (CA) for any location in its target Memory Space.

Completers supporting DMWr handle any properly formed DMWr Requests with types or operand sizes they do not support as an Unsupported Request (UR). The value of the target location must remain unchanged.

Completers supporting DMWr are allowed to implement a restricted programming model. Optimizations Based on a Restricted Programming Model as defined in the PCIe specification.

If any Function in a Multi-Function Device supports DMWr Completer or DMWr routing capability, all Functions with Memory Space BARs in that device must decode properly formed DMWr Requests and handle any they do not support as an Unsupported Request (UR). Note that in such devices, Functions lacking DMWr Completer capability must not handle properly formed DMWr Requests as Malformed TLPs.

Unless there is a higher precedence error, a DMWr-aware Completer must handle a Poisoned DMWr Request as a Poisoned TLP Received error, and must also return a Completion with a Completion Status of Unsupported Request (UR). The value of the target location must remain unchanged.

If the Completer of a DMWr Request encounters an uncorrectable error accessing the target location, the Completer must handle it as a Completer Abort (CA). The subsequent state of the target location is implementation specific.

Completers are permitted to support DMWr Requests on a subset of their target Memory Space as needed by their programming model. Memory Space structures defined or inherited by PCI Express (e.g., the MSI-X Table structure) are not required to be supported as DMWr targets unless explicitly stated in the description of the structure.

If an RC has any Root Ports that support DMWr routing capability, all RCiEPs in the RC reachable by forwarded DMWr Requests must decode properly formed DMWr Requests and handle any they do not support as an Unsupported Request (UR).

The following requirements apply to Root Complexes and Switches that support DMWr routing:

If a Switch supports DMWr routing for any of its Ports, the switch does so for all of them.

For a Switch or an RC, when DMWr Egress Blocking is enabled in an Egress Port and a DMWr Request targets going out that Egress Port, then the Egress Port handles the Request as a DMWr Egress Blocked error and must also return a Completion with a Completion Status of UR. If the severity of the DMWr Egress Blocked error is non-fatal, then this case is handled as an Advisory Non-Fatal Error as described in the PCIe specification governing Completers sending a completion with UR/CA status.

For an RC, support for peer-to-peer routing of DMWr Requests and Completions between Root Ports is optional and implementation dependent. If an RC supports DMWr routing capability between two or more Root Ports, the RC indicates that capability in each associated Root Port via the DMWr Routing Supported bit in the Device Capabilities 2 register An RC is not required to support DMWr routing between all pairs of Root Ports that have the DMWr Routing Supported bit Set. Software should not assume that DMWr routing is supported between all pairs of Root Ports that have the DMWr Routing Supported bit Set.

If an RC supports DMWr routing capability between two or more Root Ports, the RC indicates that capability in each associated Root Port via the DMWr Routing Supported bit in the Device Capabilities 2 register.

A DMWr Request that is routed through a Root Port that does not support DMWr is handled as an Unsupported Request (UR).

Implementation Note: Design Considerations for Deferrable Memory Write

In some embodiments, DMWr can be used by devices and device drivers to implement control mechanisms.

Being a Non-Posted Request, DMWr TLPs use a Completion TLP to finish the transaction. In addition, PCIe ordering rules dictate that Non-Posted TLPs cannot pass Posted TLPs, making Posted transactions preferable for improved performance. Because DMWr TLPs cannot pass Memory Read Request TLPs and DMWr TLPs can be deferred by the Completer, care is to be taken by Device and Device Driver manufacturers when attempting to read a memory location that is also the target of an outstanding DMWr Transaction.

Implementation Note: Ensuring Forward Progress with Deferrable Memory Writes

When DMWr Transactions are used to create a single shared work queue, care must be taken to ensure that no Requesters are denied access indefinitely to the queue due to congestion. Software entities that write to such a queue may choose to implement a flow control mechanism or rely on a particular programming model to ensure that all entities are able to make forward progress. This programming model may include a feedback mechanism or an indication to from the Function to software on the state of the queue, or a timer that delays DMWr Requests after a Completion with status MRS.

Memory Transactions include the following types:
Read Request/Completion;
Write Request;
Deferrable Write Request; and
AtomicOp Request/Completion.
Memory Transactions use two different address formats:
Short Address Format: 32-bit address; and
Long Address Format: 64-bit address.

Certain Memory Transactions can optionally have a PASID TLP Prefix containing the Process Address Space ID (PASID).

Figure 9A:
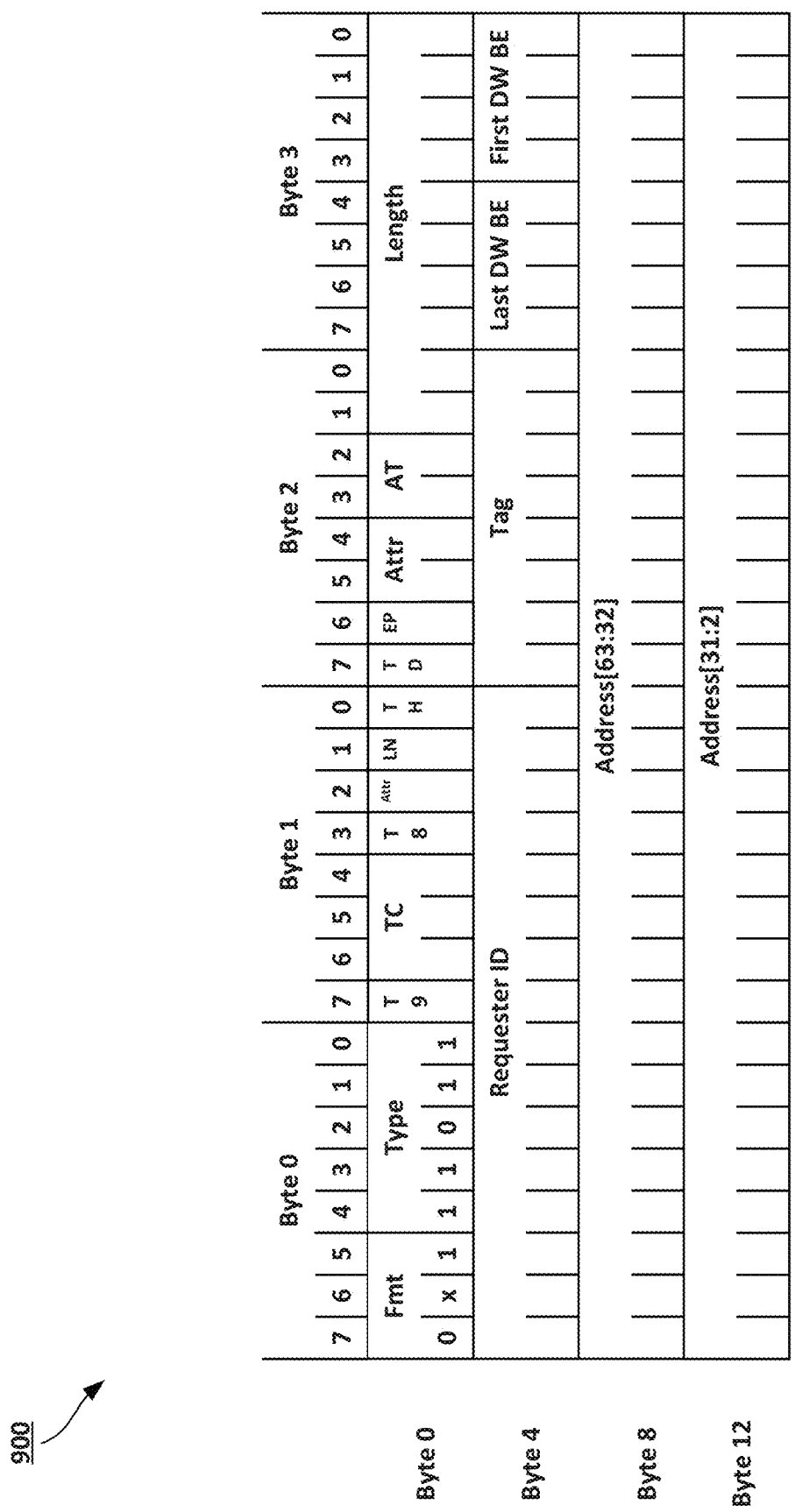
FIG. 9A is a schematic diagram of a 64-bit DMWr packet definition in accordance with embodiments of the present disclosure.
Figure 9B:
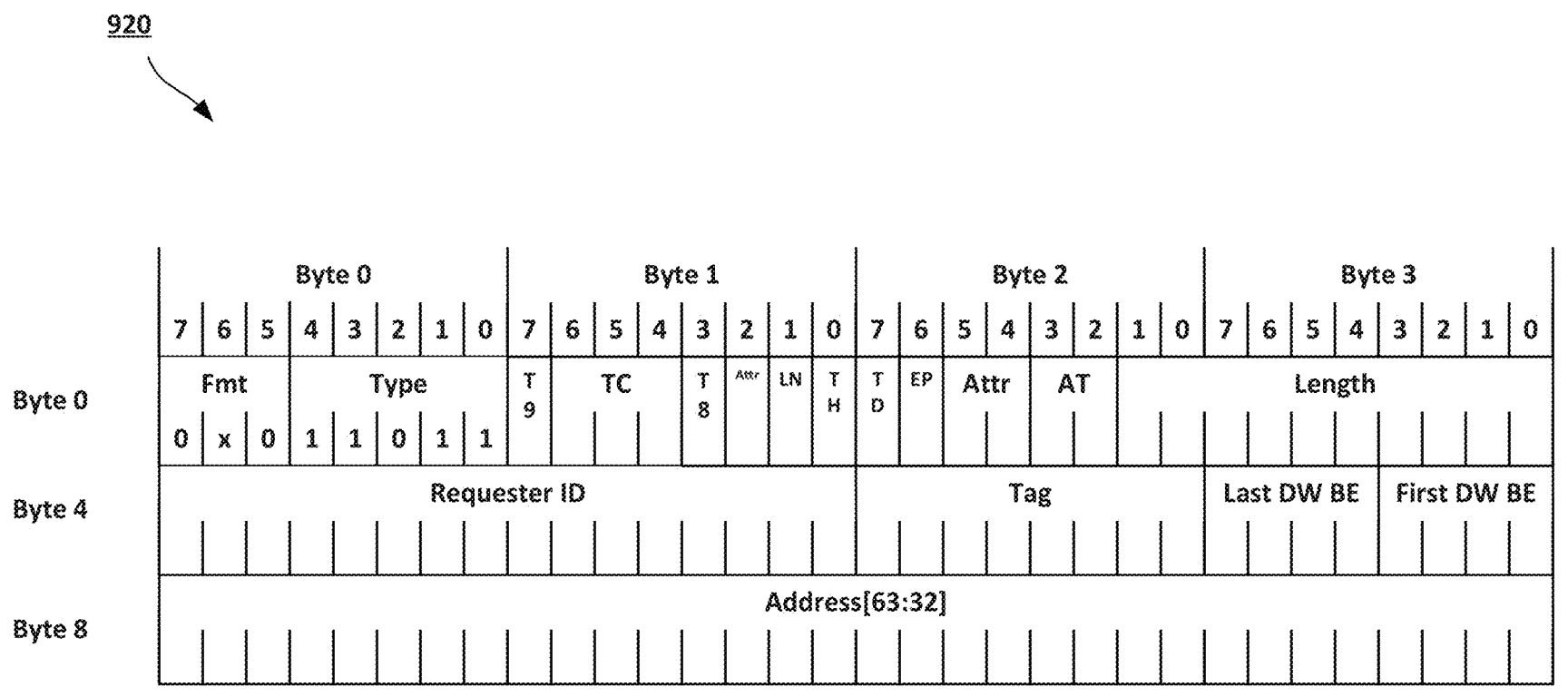

FIGS. 9A and 9B are visual representations of the AMWr packet. FIG. 9A is a schematic diagram of a 64-bit DMWr (or AMWr) packet definition 900 in accordance with embodiments of the present disclosure. FIG. 9B is a schematic diagram of a 32-bit DMWr (or AMWr) packet definition 920 in accordance with embodiments of the present disclosure.

Table 2 below represents TLP definitions to support DMWr.

TABLE 2

TLP Definitions to Support DMWr.

| TLP Type | Fmt [2:0] (b) | Type [4:0] (b) | Description |
|---|---|---|---|
| MWr | 010 011 | 0 0000 | Memory Write Request |
| DMWr | 010 011 | 1 1011 | Deferred Memory Write Request (Deprecated TLP type deleted) |
| ... | ... | ... | ... |
| Cpl | 000 | 0 1010 | Completion without Data - Used for I/O, and Configuration, and Deferrable Memory Write Completions with any Completion Status. Also used for AtomicOp Completions and Read Completions (I/O, Configuration, or Memory) with Completion Status other than Successful Completion. |

Table 3 below provides definitions for a completion status.

TABLE 3

Definitions for Completion Status.

| Completion Status [2:0] Field Value (b) | Completion Status |
|---|---|
| 000 | Successful Completion (SC) |
| 001 | Unsupported Request (UR) |
| 010 | Configuration Request Retry Status (CRS) |
| 100 | Completer Abort (CA) |
| 101 | Memory Request Retry Status (MRS) |
| all others | Reserved |

Address-based routing rules can also facilitate the DMWr requests. Address routing is used with Memory and I/O Requests. Two address formats are specified: a 64-bit format used with a 4 DW header and a 32-bit format used with a 3 DW header. FIGS. 9A-B represent the 64 and 32 bit formats, respectively.

For Memory Read, Memory Write, Deferrable Memory Write, and AtomicOp Requests, the Address Type (AT) field is encoded as shown in Table 10-1 Address Type (AT) Field Encodings. For all other Requests, the AT field is Reserved unless explicitly stated otherwise. LN Reads and LN Writes have special requirements.

Memory Read, Memory Write, Deferrable Memory Write, and AtomicOp Requests can use either format.

For Addresses below 4 GB, Requesters must use the 32-bit format. The behavior of the Receiver is not specified if a 64-bit format request addressing below 4 GB (i.e., with the upper 32 bits of address all 0) is received.

I/O Read Requests and I/O Write Requests use the 32-bit format.

Agents decode all address bits in the header-address aliasing is not allowed.

The request handling rules can support DMWr. If the device supports being a target for I/O Write Requests, which are Non-Posted Requests, each associated Completion should be returned within the same time limit as for Posted Request acceptance. If the device supports being a target for Deferrable Memory Write Requests, each associated Completion is returned within the same time limit as for Posted Request acceptance.

Flow control rules can also support DMWr. Each Virtual Channel has independent Flow Control. Flow Control distinguishes three types of TLPs:
Posted Requests (P)—Messages and Memory Writes;
Non-Posted Requests (NP)—All Reads, I/O Writes, Configuration Writes, AtomicOps, and Deferrable Memory Writes; and
Completions (Cpl)—Associated with corresponding NP Requests In addition, Flow Control distinguishes the following types of TLP information within each of the three types: Headers (H); and Data (D).

Thus, there are six types of information tracked by Flow Control for each Virtual Channel, as shown in Table 4 Flow Control Credit Types.

TABLE 4

Flow Control Credit Types.

| Credit Type | Completion Status |
|---|---|
| PH | Posted Request Header |
| PD | Posted Request Data Payload |
| NPH | Non-Posted Request Header |
| NPD | Non-Posted Request Data Payload |
| CplH | Completion Headers |
| CplD | Completion Data Payload |

TLPs consume Flow Control credits as shown in Table 5 TLP Flow Control Credit Consumption.

TABLE 5

TLP Flow Control Credit Consumption.

| TLP | Credit Consumed |
|---|---|
| Memory, I/O, Configuration Read Request | 1 NPH unit |
| Memory Write Request | 1 PH + n PD units |
| I/O, Configuration Write Request | 1 NPH + 1 NPD Note: size of data written is never more than 1 (aligned) DW |
| AtomicOp, Deferrable Memory Write Request | 1 NPH + n NPD units |
| Message Requests without data | 1 PH unit |
| Message Requests with data | 1 PH + n NPD units |

TABLE 5-continued

TLP Flow Control Credit Consumption.

| TLP | Credit Consumed |
|---|---|
| Memory Read Completion | 1 CplH + n CplD units |
| I/O, Configuration Read Completions | 1 CplH unit + 1 CplH unit |
| I/O, Configuration, Deferrable Memory Write Completions | 1 CplH unit |
| AtomicOp Completion | 1 CplH unit + 1 CplD unit Note: size of data returned is never more than 4 (aligned) DWs |

Table 6 shows minimum advertisement for the NPD credit type.

TABLE 6

Minimum Initial Flow Control Advertisements.

| | Minimum Advertisement | | |
|---|---|---|---|
| Credit Type | No Scaling or Scale Factor 1 | Scale Factor 4 | Scale Factor 16 |
| . . . | . . . | . . . | . . . |
| NPD | Receiver that supports DMWr routing capability or DMWr Completer capability: 4 units - credit value of 004h Receiver that supports AtomicOp routing capability or any AtomicOp Completer capability: 2 units - credit value of 002h All other Receivers: 1 unit - credit value of 001h. | Receiver that supports DMWr routing capability or DMWr Completer capability: 4 units - credit value of 004h Receiver that supports AtomicOp routing capability or any AtomicOp Completer capability: 2 units - credit value of 002h All other Receivers: 1 unit - credit value of 001h. | Receiver that supports DMWr routing capability or DMWr Completer capability: 4 units - credit value of 004h Receiver that supports AtomicOp routing capability or any AtomicOp Completer capability: 2 units - credit value of 002h All other Receivers: 1 unit - credit value of 001h. |
| . . . | . . . | . . . | . . . |

For errors detected in the Transaction layer and Uncorrectable Internal Errors, it is permitted and recommended that no more than one error be reported for a single received TLP, and that the following precedence (from highest to lowest) be used:

Uncorrectable Internal Error

Receiver Overflow;

Malformed TLP;

ECRC Check Failed;

AtomicOp or DMWr Egress Blocked;

TLP Prefix Blocked;

ACS Violation;

MC Blocked TLP;

Unsupported Request (UR), Completer Abort (CA), or Unexpected Completion; and

Poisoned TLP Received or Poisoned TLP Egress Blocked

Table 7 shows a transaction layer error list. The transaction layer error list can be used by detecting agents, such as egress ports, to identify errors when handling DMWr packets.

TABLE 7

Transaction Layer Error List.

| Error Name | Error Type (Default Severity) | Detecting Agent Action [4:0] (b) | References |
|---|---|---|---|
| . . . | . . . | . . . | . . . |
| AtomicOP Egress Blockedr | . . . | . . . | . . . |
| DMWr Egress Blocked | Uncorrectable (non-fatal) | Egress Port: Send ERR_COR to Root Complex. This is an Advisory Non-Fatal Error case described in Section 6.2.3.2.4.1 Completer Sending a Completion with UR/CA Status. Log the prefix/header of the DMWr Request that encountered the error. | Section re: Deferred Memory Write |
| . . . | . . . | . . . | . . . |

Table 8 provides bit mapping to a device capabilities 2 register:

TABLE 8

Device Capabilities 2 Register.

| Bit Location | Register Description | Attributes |
|---|---|---|
| . . . | . . . | . . . |
| 27 | DMWr Routing Supported - Applicable only to Switch Upstream Ports, Switch Downstream Ports, and Root Ports; must be 0 b for other Function types. This bit must be set to 1 b if the Port supports this optional capability. | HWInit |
| 28 | DMWr Completer Supported - Applicable to Functions with Memory Space BARs as well as all Root Ports; This bit must be set to 1 b if the function can serve as a DMWr Completer. | HWInit |
| . . . | . . . | . . . |

Table 9 provides bit mapping to a device capabilities 4 register:

TABLE 9

Device Capabilities 3 Register.

| Bit Location | Register Description | Attributes |
|---|---|---|
| 0 | Deferrable Memory Write Requester Enable - Applicable only to Endpoints and Root Ports; must be hardwired to 0 b for other Function types. The Function is allowed to initiate Deferrable Memory Writes only if this bit and the Bus Master Enable bit in the Command register are both Set. This bit is required to be RW if the Endpoint or Root Port is capable of initiating Deferrable Memory Write Requests, but otherwise is permitted to be hardwired to 0 b. Default value of this bit is 0 b. | RW |
| 28 | Deferrable Memory Write Egress Blocking - Applicable and mandatory for Switch Upstream Ports, Switch Downstream Ports, and Root Ports that implement Deferrable Memory Write routing; otherwise must be hardwired to 0 b. When this bit is Set, Deferrable Memory Write Requests that target going out this Egress Port must be blocked. See Section 6.30 Default value of this bit is 0 b. | RW |

Table 10 represents definitions to uncorrectable error status register bit values.

TABLE 10

Uncorrectable Error Status Register.

| Bit Location | Register Description | Attributes | Default |
|---|---|---|---|
| ... | ... | ... | ... |
| 1 | DMWr Egress Blocked Status | RW1CS | 0 b |
| ... | ... | ... | ... |

Table 11 represents definitions of uncorrectable error mask register bit values.

TABLE 11

Uncorrectable Error Mask Register.

| Bit Location | Register Description | Attributes | Default |
|---|---|---|---|
| ... | ... | ... | ... |
| 1 | DMWr Egress Blocked Mask (Optional) | RWS | 0 b |
| ... | ... | ... | ... |

Table 12 represents definitions of uncorrectable error severity register bit values.

TABLE 12

Uncorrectable Error Severity Register.

| Bit Location | Register Description | Attributes | Default |
|---|---|---|---|
| ... | ... | ... | ... |
| 1 | DMWr Egress Blocked Severity (Optional) | RWS | 0 b |
| ... | ... | ... | ... |

In embodiments, AMWr can be used for non-posted write requests for scability of work requests to completers. The following features can facilitate AMWr messaging on PCIe based interconnects:

The definition of a Transaction Layer Packet (TLP) Type "AMWr" (e.g., using value 0b11011, which was previously used for the deprecated TCfgWr TLP Type);

The expansion of the CRS Completion Status to be applicable to other non-configuration Packets (referred to herein as "Request Retry Status (RRS)";

Adding AMWr Routing and Egress Blocking support to PCIe Ports;

Adding AMWr Requester & Completer Support to Endpoints and Root Complexes; and

Adding AMWr Egress Blocked reporting to Advanced Error Reporting (AER).

The Acknowledged Memory Write (AMWr) is a Non-Posted Request and enables easy scalability for high performance, low latency devices such as accelerators, implementing a shared work queue or an acknowledged doorbell write. The number of unique application clients that can submit work to such devices is typically dependent on the number of queues and doorbells supported by the device. With AMWr, accelerator-type (and other I/O) devices can have a single shared work queue and accept work items from multiple non-cooperating software agents in a non-blocking way. Devices could expose such shared work queues in an implementation-specific way.

As with other PCIe Transactions, the support for peer-to-peer routing of AMWr Requests and Completions between Root Ports is optional and implementation dependent. If a Root Complex (RC) supports AMWr routing capability between two or more Root Ports, the RC indicates that capability in each associated Root Port via the AMWr Routing Supported bit in the Device Capabilities 2 register If a Switch supports AMWr routing for any of its Ports, it may do so for all of them.

For a Switch or an RC, when AMWr Egress Blocking is enabled in an Egress Port, and an AMWr Request targets going out from that Egress Port, the Egress Port handles the Request as an Unsupported Request error and must also return a Completion with a Completion Status of UR.

In embodiments, for a Switch or an RC, when AMWr Egress Blocking is enabled in an Egress Port, and an AMWr Request targets going out from that Egress Port, the Egress Port handles the Request as an AMWr Egress Blocked error and also returns a Completion with a Completion Status of UR. If the severity of the AMWr Egress Blocked error is non-fatal, this case must be handled as an Advisory Non-Fatal Error.

An RC is not required to support AMWr routing between all pairs of Root Ports that have the AMWr Routing Supported bit Set. An AMWr Request that would require routing between unsupported pairs of Root Ports must be handled as an Unsupported Request (UR), and reported by the "sending" Port. If a RC supports AMWr routing capability between two or more Root Ports, it must indicate that capability in each associated Root Port via the AW Routing Supported bit in the Device Capabilities 2 register. Software must not assume that AMWr routing is supported between all pairs of Root Ports that have the AMWr Routing Supported bit Set.

Completers (e.g., entities completing the AMWr requests) supporting AMWr Requests are required to handle properly formatted AMWr Requests as a Successful Completion (SC), Request Retry Status (RRS), Unsupported Request (UR), or Completer Abort (CA) for any location in its target Memory Space. The following features apply to AMWr Completers:

Unless there is a higher precedence error, an AMWr-aware Completer handles a poisoned or corrupted AMWr Request as a Poisoned TLP Received error and returns a Completion with a Completion Status of Unsupported Request (UR). The value of the target location must remain unchanged.

If the Completer of an AMWr Request encounters an uncorrectable error accessing the target location or carrying out the Acknowledged Write, the Completer must handle it as a Completer Abort (CA). The subsequent state of the target location is implementation specific.

AMWr-aware Completers are required to handle any properly formed AMWr Requests with types or operand sizes they do not support as an Unsupported Request (UR).

If any Function in a Multi-Function Device supports AMWr Completer or AMWr routing capability, all Functions with Memory Space BARs in that device can decode properly formed AMWr Requests and handle any supported functions as an Unsupported Request (UR). Note that in such devices, Functions lacking AMWr Completer capability are forbidden to handle properly formed AMWr Requests as Malformed TLPs.

If an RC has any Root Ports that support AMWr routing capability, all RCiEPs in the RC reachable by forwarded AMWr Requests must decode properly formed AMWr Requests and handle any they do not support as an Unsupported Request (UR).

With an AMWr Request having a supported type and operand size, the AMWr-aware Completer is required either to carry out the Request or handle it as Completer Abort (CA) for any location in its target Memory Space. Completers are permitted to support AMWr Requests on a subset of their target Memory Space as needed by their programming model (see Section 2.3.1 Request Handling Rules). Memory Space structures defined or inherited by PCI Express (e.g., the MSI-X Table structure) are not required to be supported as AMWr targets unless explicitly stated in the description of the structure.

Implementing AMWr Completer support is optional.

In some embodiments, AMWr can be used by devices and device drivers to implement control mechanisms.

Being a Non-Posted Request, AMWr TLPs uses a Completion TLP to finish the transaction. In addition, PCIe ordering rules state that Non-Posted TLPs cannot pass Posted TLPs, making Posted transactions preferable for improved performance.

The packet definitions can be interpreted based, at least in part, on the following definitions, which can represent changes to the PCIe specification:

Memory Transactions include the following types:

Read Request/Completion;

Write Request;

Acknowledged Write Request (adding the AMWr packet here);

AtomicOp Request/Completion; etc.

Table 13 below is a representation of Table 2-3 of the PCIe specification. Here, the Table 13 includes TLP definitions to support AMWr.

TABLE 13

TLP Definitions to Support AMWr.

| TLP Type | Fmt [2:0] (b) | Type [4:0] (b) | Description |
|---|---|---|---|
| . . . | . . . | . . . | . . . |
| AMWr | 010 011 | 11011 | Acknowledged Memory Write Request |
| . . . | . . . | . . . | . . . |
| Cpl | 000 | 01010 | Completion without Data - Used for I/O, Configuration, and Acknowledged Memory Write Completions with any Completion Status. Also used for AtomicOp Completions and Read Completions (I/O, Configuration, or Memory) with Completion Status other than Successful Completion. |

Table 14 below provides definitions for a completion status.

TABLE 14

Definitions for Completion Status.

| Completion Status [2:0] Field Value (b) | Completion Status |
|---|---|
| 000 | Successful Completion (SC) |
| 001 | Unsupported Request (UR) |
| 010 | Request Retry Status (RRS) |
| 100 | Completer Abort (CA) |
| all others | Reserved |

Various other changes to the PCIe specification can be made to facilitate the AMWr messaging for scalable workflow submissions.

The following register and bit values can be defined to support AMWr:

In a device control 3 register (e.g., as defined in PCIe specification), Table 15 can provide a definition or register bits.

TABLE 15

Device Control 3 Register.

| Bit Location | Register Description | Attributes |
|---|---|---|
| 0 | Acknowledged Memory Write Requester Enable - Applicable only to Endpoints and Root Ports; must be hardwired to 0 b for other Function types. The Function is allowed to initiate Acknowledged Memory Writes only if this bit and the Bus Master Enable bit in the Command register are both Set. This bit is required to be RW if the Endpoint or Root Port is capable of initiating Acknowledged Memory Write Requests, but otherwise is permitted to be hardwired to 0 b. Default value of this bit is 0 b. | RW |
| 1 | Acknowledged Memory Write Egress Blocking - Applicable and mandatory for Switch Upstream Ports, Switch Downstream Ports, and Root Ports that implement Acknowledged Memory Write routing; otherwise must be hardwired to 0 b. When this bit is Set, Acknowledged Memory Write Requests that target going out this Egress Port must be blocked. Default value of this bit is 0 b. | RW |

Table 16 represents definitions of uncorrectable error status register bit values.

TABLE 16

Uncorrectable Error Status Register.

| Bit Location | Register Description | Attributes | Default |
|---|---|---|---|
| ... | ... | ... | ... |
| 1 | AMWr Egress Blocked Status (Optional) | RW1CS | 0 b |
| ... | ... | ... | ... |

Table 17 represents definitions of uncorrectable error mask register bit values.

TABLE 17

Uncorrectable Error Mask Register.

| Bit Location | Register Description | Attributes | Default |
|---|---|---|---|
| ... | ... | ... | ... |
| 1 | AMWr Egress Blocked Mask (Optional) | RWS | 0 b |
| ... | ... | ... | ... |

Table 18 represents definitions of uncorrectable error severity register bit values.

TABLE 18

Uncorrectable Error Severity Register.

| Bit Location | Register Description | Attributes | Default |
|---|---|---|---|
| ... | ... | ... | ... |
| 1 | AMWr Egress Blocked Severity (Optional) | RWS | 0 b |
| ... | ... | ... | ... |

Figure 10:
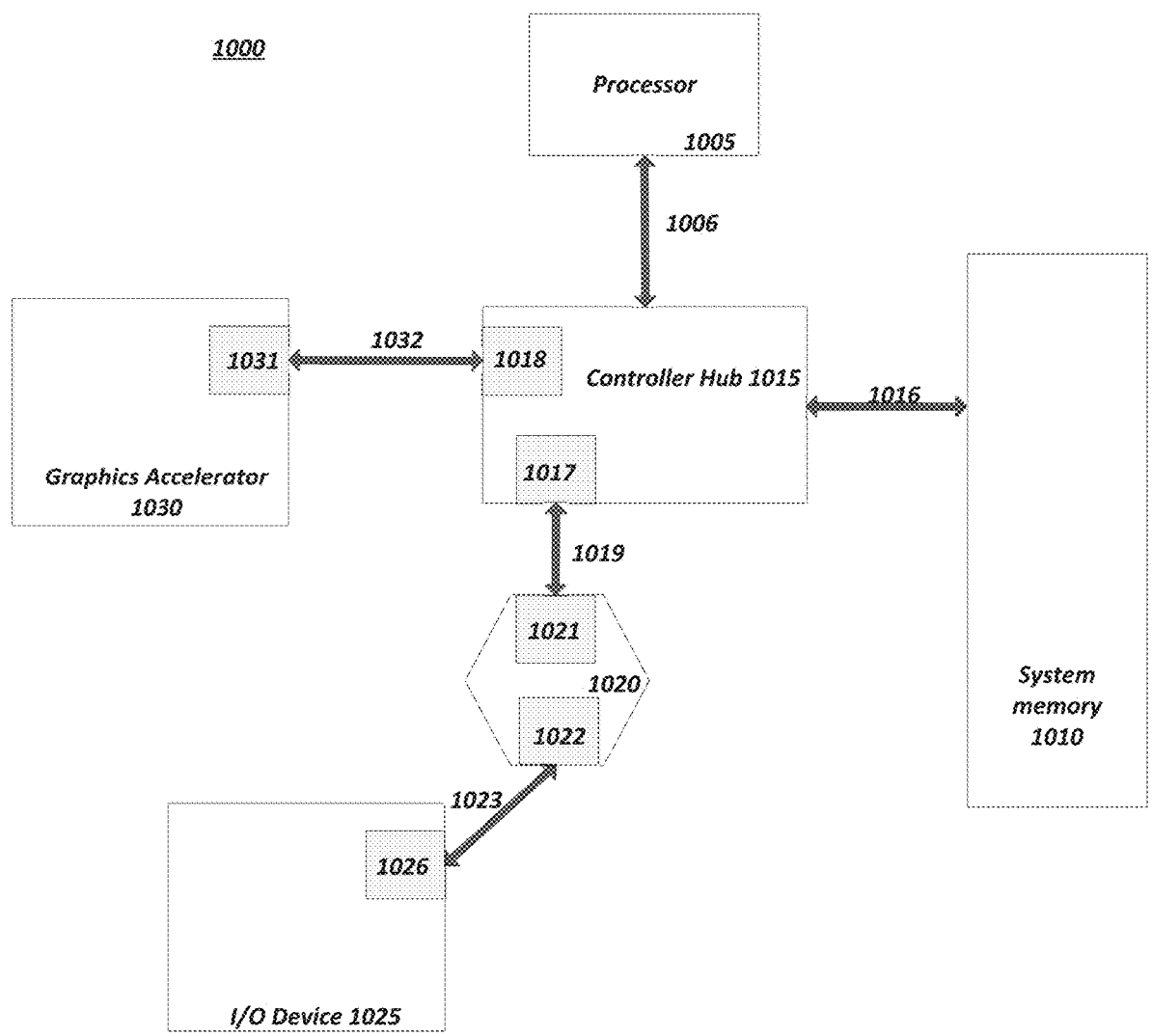
FIG. 10 illustrates an embodiment of a computing system including an interconnect architecture.

FIG. 10 illustrates an embodiment of a computing system including an interconnect architecture. Referring to FIG. 10, an embodiment of a fabric composed of point-to-point Links that interconnect a set of components is illustrated. System 1000 includes processor 1005 and system memory 1010 coupled to controller hub 1015. Processor 1005 includes any processing element, such as a microprocessor, a host processor, an embedded processor, a co-processor, or other processor. Processor 1005 is coupled to controller hub 1015 through front-side bus (FSB) 1006. In one embodiment, FSB 1006 is a serial point-to-point interconnect as described below. In another embodiment, link 1006 includes a serial, differential interconnect architecture that is compliant with different interconnect standard.

System memory 1010 includes any memory device, such as random access memory (RAM), non-volatile (NV) memory, or other memory accessible by devices in system 1000. System memory 1010 is coupled to controller hub 1015 through memory interface 1016. Examples of a memory interface include a double-data rate (DDR) memory interface, a dual-channel DDR memory interface, and a dynamic RAM (DRAM) memory interface.

In one embodiment, controller hub 1015 is a root hub, root complex, or root controller in a Peripheral Component Interconnect Express (PCIe or PCIE) interconnection hierarchy. Examples of controller hub 1015 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 1005, while controller 1015 is to communicate with I/O devices, in a similar manner as described below. In some embodiments, peer-to-peer routing is optionally supported through root complex 1015.

Here, controller hub 1015 is coupled to switch/bridge 1020 through serial link 1019. Input/output modules 1017 and 1021, which may also be referred to as interfaces/ports 1017 and 1021, include/implement a layered protocol stack to provide communication between controller hub 1015 and switch 1020. In one embodiment, multiple devices are capable of being coupled to switch 1020.

Switch/bridge 1020 routes packets/messages from device 1025 upstream, i.e. up a hierarchy towards a root complex, to controller hub 1015 and downstream, i.e. down a hierarchy away from a root controller, from processor 1005 or system memory 1010 to device 1025. Switch 1020, in one embodiment, is referred to as a logical assembly of multiple virtual PCI-to-PCI bridge devices. Device 1025 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1025 may include a PCIe to PCI/PCI-X bridge to support legacy or other version PCI devices. Endpoint devices in PCIe are often classified as legacy, PCIe, or root complex integrated endpoints.

Graphics accelerator 1030 is also coupled to controller hub 1015 through serial link 1032. In one embodiment, graphics accelerator 1030 is coupled to an MCH, which is coupled to an ICH. Switch 1020, and accordingly I/O device 1025, is then coupled to the ICH. I/O modules 1031 and 1018 are also to implement a layered protocol stack to communicate between graphics accelerator 1030 and controller hub 1015. Similar to the MCH discussion above, a graphics controller or the graphics accelerator 1030 itself may be integrated in processor 1005.

Figure 11:
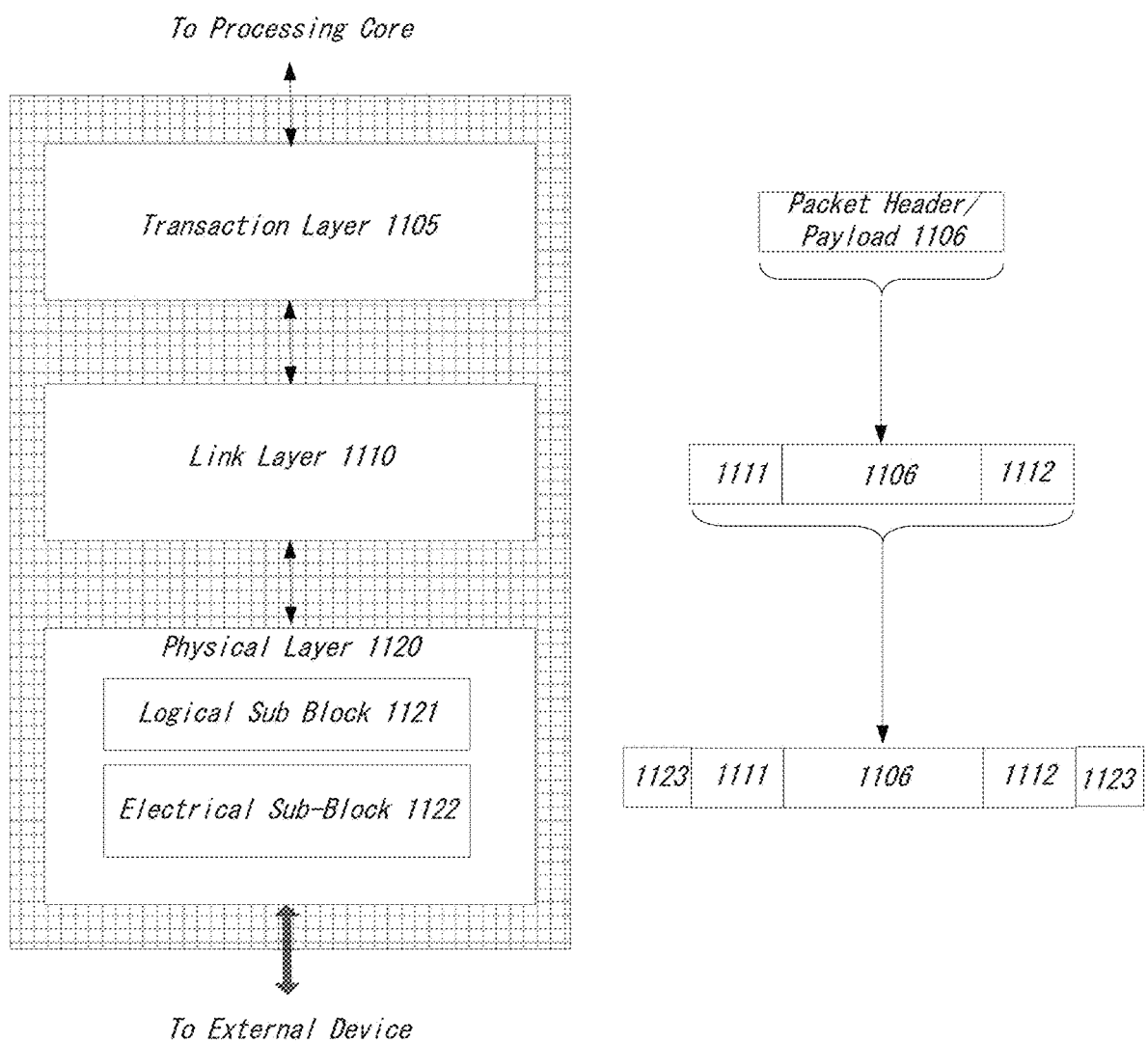
FIG. 11 illustrates an embodiment of a interconnect architecture including a layered stack.

FIG. 11 illustrates an embodiment of a interconnect architecture including a layered stack. Turning to FIG. 11 an embodiment of a layered protocol stack is illustrated. Layered protocol stack 1100 includes any form of a layered communication stack, such as a Quick Path Interconnect (QPI) stack, a PCie stack, a next generation high performance computing interconnect stack, or other layered stack. Although the discussion immediately below in reference to FIGS. 10-13 are in relation to a PCIe stack, the same concepts may be applied to other interconnect stacks. In one embodiment, protocol stack 1100 is a PCIe protocol stack including transaction layer 1105, link layer 1110, and physical layer 1120. An interface, such as interfaces 1017, 1018, 1021, 1022, 1026, and 1031 in FIG. 1, may be represented as communication protocol stack 1100. Representation as a communication protocol stack may also be referred to as a module or interface implementing/including a protocol stack.

PCI Express uses packets to communicate information between components. Packets are formed in the Transaction Layer 1105 and Data Link Layer 1110 to carry the information from the transmitting component to the receiving component. As the transmitted packets flow through the other layers, they are extended with additional information necessary to handle packets at those layers. At the receiving side the reverse process occurs and packets get transformed from their Physical Layer 1120 representation to the Data Link Layer 1110 representation and finally (for Transaction Layer Packets) to the form that can be processed by the Transaction Layer 1105 of the receiving device.

Transaction Layer

In one embodiment, transaction layer 1105 is to provide an interface between a device's processing core and the interconnect architecture, such as data link layer 1110 and physical layer 1120. In this regard, a primary responsibility of the transaction layer 1105 is the assembly and disassembly of packets (i.e., transaction layer packets, or TLPs). The translation layer 1105 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1105. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1105 assembles packet header/payload 1106. Format for current packet headers/payloads may be found in the PCIe specification at the PCIe specification website.

Figure 12:
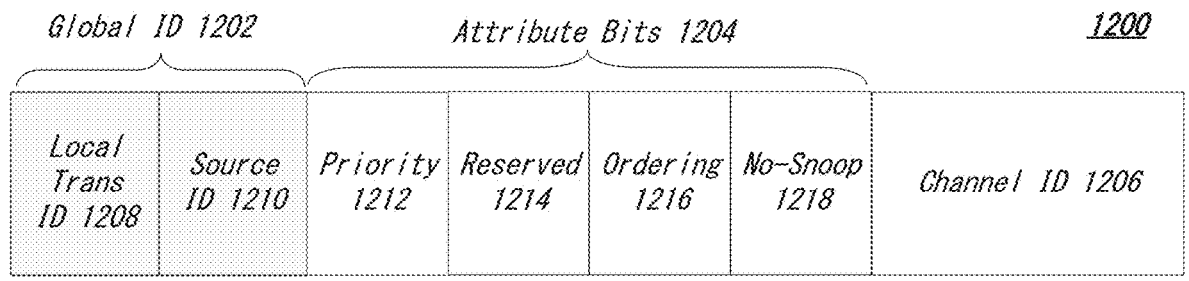
FIG. 12 illustrates an embodiment of a request or packet to be generated or received within an interconnect architecture.

Quickly referring to FIG. 12: FIG. 12 illustrates an embodiment of a request or packet to be generated or received within an interconnect architecture. An embodiment of a PCIe transaction descriptor is illustrated. In one embodiment, transaction descriptor 1200 is a mechanism for carrying transaction information. In this regard, transaction descriptor 1200 supports identification of transactions in a system. Other potential uses include tracking modifications of default transaction ordering and association of transaction with channels.

Transaction descriptor 1200 includes global identifier field 1202, attributes field 1204 and channel identifier field 1206. In the illustrated example, global identifier field 1202 is depicted comprising local transaction identifier field 1208 and source identifier field 1210. In one embodiment, global transaction identifier 1202 is unique for all outstanding requests.

According to one implementation, local transaction identifier field 1208 is a field generated by a requesting agent, and it is unique for all outstanding requests that require a completion for that requesting agent. Furthermore, in this example, source identifier 1210 uniquely identifies the requestor agent within a PCIe hierarchy. Accordingly, together with source ID 1210, local transaction identifier 1208 field provides global identification of a transaction within a hierarchy domain.

Attributes field 1204 specifies characteristics and relationships of the transaction. In this regard, attributes field 1204 is potentially used to provide additional information that allows modification of the default handling of transactions. In one embodiment, attributes field 1204 includes priority field 1212, reserved field 1214, ordering field 1216, and no-snoop field 1218. Here, priority sub-field 1212 may be modified by an initiator to assign a priority to the transaction. Reserved attribute field 1214 is left reserved for future, or vendor-defined usage. Possible usage models using priority or security attributes may be implemented using the reserved attribute field.

In this example, ordering attribute field 1216 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1218 is utilized to determine if transactions are snooped. As shown, channel ID Field 1206 identifies a channel that a transaction is associated with.

Link Layer

Link layer 1110, also referred to as data link layer 1110, acts as an intermediate stage between transaction layer 1105 and the physical layer 1120. In one embodiment, a responsibility of the data link layer 1110 is providing a reliable mechanism for exchanging Transaction Layer Packets (TLPs) between two components a link. One side of the Data Link Layer 1110 accepts TLPs assembled by the Transaction Layer 1105, applies packet sequence identifier 1111, i.e. an identification number or packet number, calculates and applies an error detection code, i.e. CRC 1112, and submits the modified TLPs to the Physical Layer 1120 for transmission across a physical to an external device.

Physical Layer

In one embodiment, physical layer 1120 includes logical sub block 1121 and electrical sub-block 1122 to physically transmit a packet to an external device. Here, logical sub-block 1121 is responsible for the "digital" functions of Physical Layer 1121. In this regard, the logical sub-block includes a transmit section to prepare outgoing information for transmission by physical sub-block 1122, and a receiver section to identify and prepare received information before passing it to the Link Layer 1110.

Physical block 1122 includes a transmitter and a receiver. The transmitter is supplied by logical sub-block 1121 with symbols, which the transmitter serializes and transmits onto to an external device. The receiver is supplied with serialized symbols from an external device and transforms the received signals into a bit-stream. The bit-stream is de-serialized and supplied to logical sub-block 1121. In one embodiment, an 8b/10b transmission code is employed, where ten-bit symbols are transmitted/received. Here, special symbols are used to frame a packet with frames 1123. In addition, in one example, the receiver also provides a symbol clock recovered from the incoming serial stream.

As stated above, although transaction layer 1105, link layer 1110, and physical layer 1120 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 13:
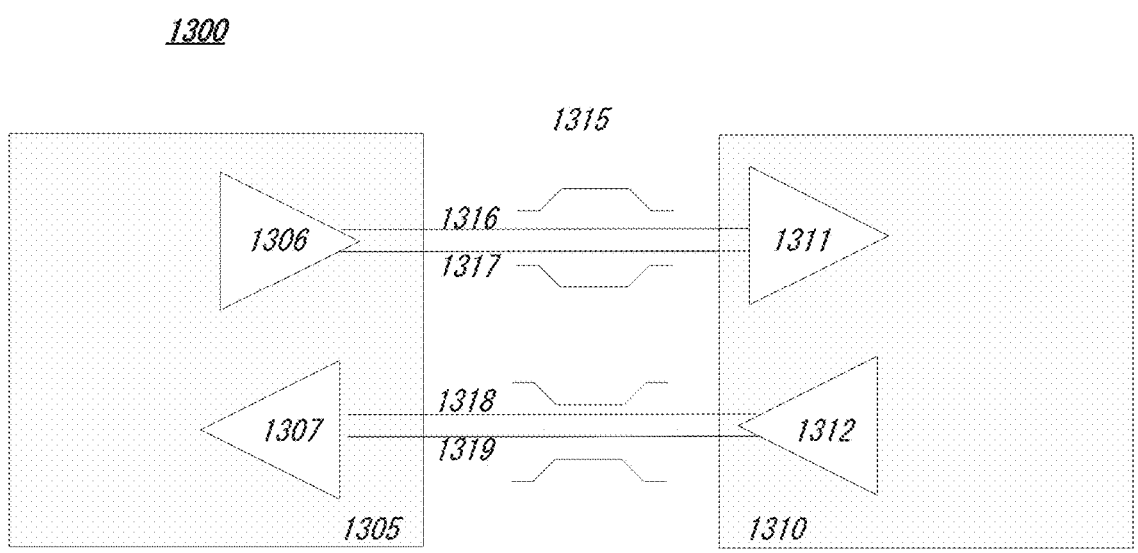
FIG. 13 illustrates an embodiment of a transmitter and receiver pair for an interconnect architecture.

FIG. 13 illustrates an embodiment of a transmitter and receiver pair for an interconnect architecture. An embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1306/1311 and a receive pair 1312/1307. Accordingly, device 1305 includes transmission logic 1306 to transmit data to device 1310 and receiving logic 1307 to receive data from device 1310. In other words, two transmitting paths, i.e. paths 1316 and 1317, and two receiving paths, i.e. paths 1318 and 1319, are included in a PCIe link.

A transmission path refers to any path for transmitting data, such as a transmission line, a copper line, an optical line, a wireless communication channel, an infrared communication link, or other communication path. A connection between two devices, such as device 1305 and device 1310, is referred to as a link, such as link 1315. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1316 and 1317, to transmit differential signals. As an example, when line 1316 toggles from a low voltage level to a high voltage level, i.e. a rising edge, line 1317 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 14:
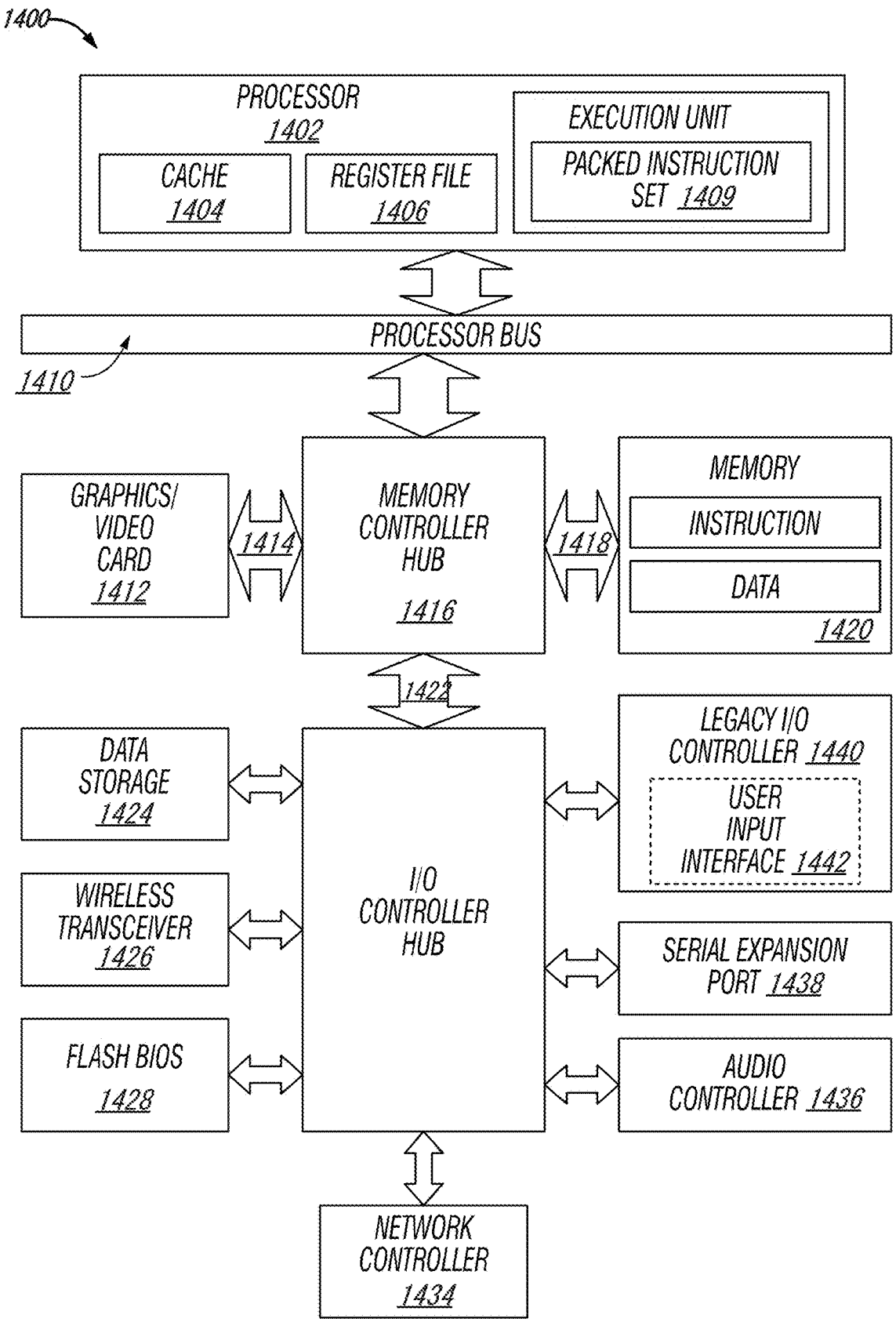
FIG. 14 illustrates another embodiment of a block diagram for a computing system including a processor.

FIG. 14 illustrates another embodiment of a block diagram for a computing system including a processor. Turning to FIG. 14, a block diagram of an exemplary computer system formed with a processor that includes execution units to execute an instruction, where one or more of the interconnects implement one or more features in accordance with one embodiment of the present invention is illustrated. System 1400 includes a component, such as a processor 1402 to employ execution units including logic to perform algorithms for process data, in accordance with the present invention, such as in the embodiment described herein. System 1400 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1400 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1402 includes one or more execution units 1408 to implement an algorithm that is to perform at least one instruction. One embodiment may be described in the context of a single processor desktop or server system, but alternative embodiments may be included in a multiprocessor system. System 1400 is an example of a 'hub' system architecture. The computer system 1400 includes a processor 1402 to process data signals. The processor 1402, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1402 is coupled to a processor bus 1410 that transmits data signals between the processor 1402 and other components in the system 1400. The elements of system 1400 (e.g. graphics accelerator 1412, memory controller hub 1416, memory 1420, I/O controller hub 1424, wireless transceiver 1426, Flash BIOS 1428, Network controller 1434, Audio controller 1436, Serial expansion port 1438, I/O controller 1440, etc.) perform their conventional functions that are well known to those familiar with the art.

In one embodiment, the processor 1402 includes a Level 1 (L1) internal cache memory 1404. Depending on the architecture, the processor 1402 may have a single internal cache or multiple levels of internal caches. Other embodiments include a combination of both internal and external caches depending on the particular implementation and needs. Register file 1406 is to store different types of data in various registers including integer registers, floating point registers, vector registers, banked registers, shadow registers, checkpoint registers, status registers, and instruction pointer register.

Execution unit 1408, including logic to perform integer and floating point operations, also resides in the processor 1402. The processor 1402, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1402. For one embodiment, execution unit 1408 includes logic to handle a packed instruction set 1409. By including the packed instruction set 1409 in the instruction set of a general-purpose processor 1402, along with associated circuitry to execute the instructions, the operations used by many multimedia applications may be performed using packed data in a general-purpose processor 1402. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1408 may also be used in micro controllers, embedded processors, graphics devices, DSPs, and other types of logic circuits. System 1400 includes a memory 1420. Memory 1420 includes a dynamic random access memory (DRAM) device, a static random access memory (SRAM) device, flash memory device, or other memory device. Memory 1420 stores instructions and/or data represented by data signals that are to be executed by the processor 1402.

Note that any of the aforementioned features or aspects of the invention may be utilized on one or more interconnect illustrated in FIG. 14. For example, an on-die interconnect (ODI), which is not shown, for coupling internal units of processor 1402 implements one or more aspects of the invention described above. Or the invention is associated with a processor bus 1410 (e.g. Intel Quick Path Interconnect (QPI) or other known high performance computing interconnect), a high bandwidth memory path 1418 to memory 1420, a point-to-point link to graphics accelerator 1412 (e.g. a Peripheral Component Interconnect express (PCIe) compliant fabric), a controller hub interconnect 1422, an I/O or other interconnect (e.g. USB, PCI, PCIe) for coupling the other illustrated components. Some examples of such components include the audio controller 1436, firmware hub (flash BIOS) 1428, wireless transceiver 1426, data storage 1424, legacy I/O controller 1410 containing user input and keyboard interfaces 1442, a serial expansion port 1438 such as Universal Serial Bus (USB), and a network controller 1434. The data storage device 1424 can comprise a hard disk drive, a floppy disk drive, a CD-ROM device, a flash memory device, or other mass storage device.

Figure 15:
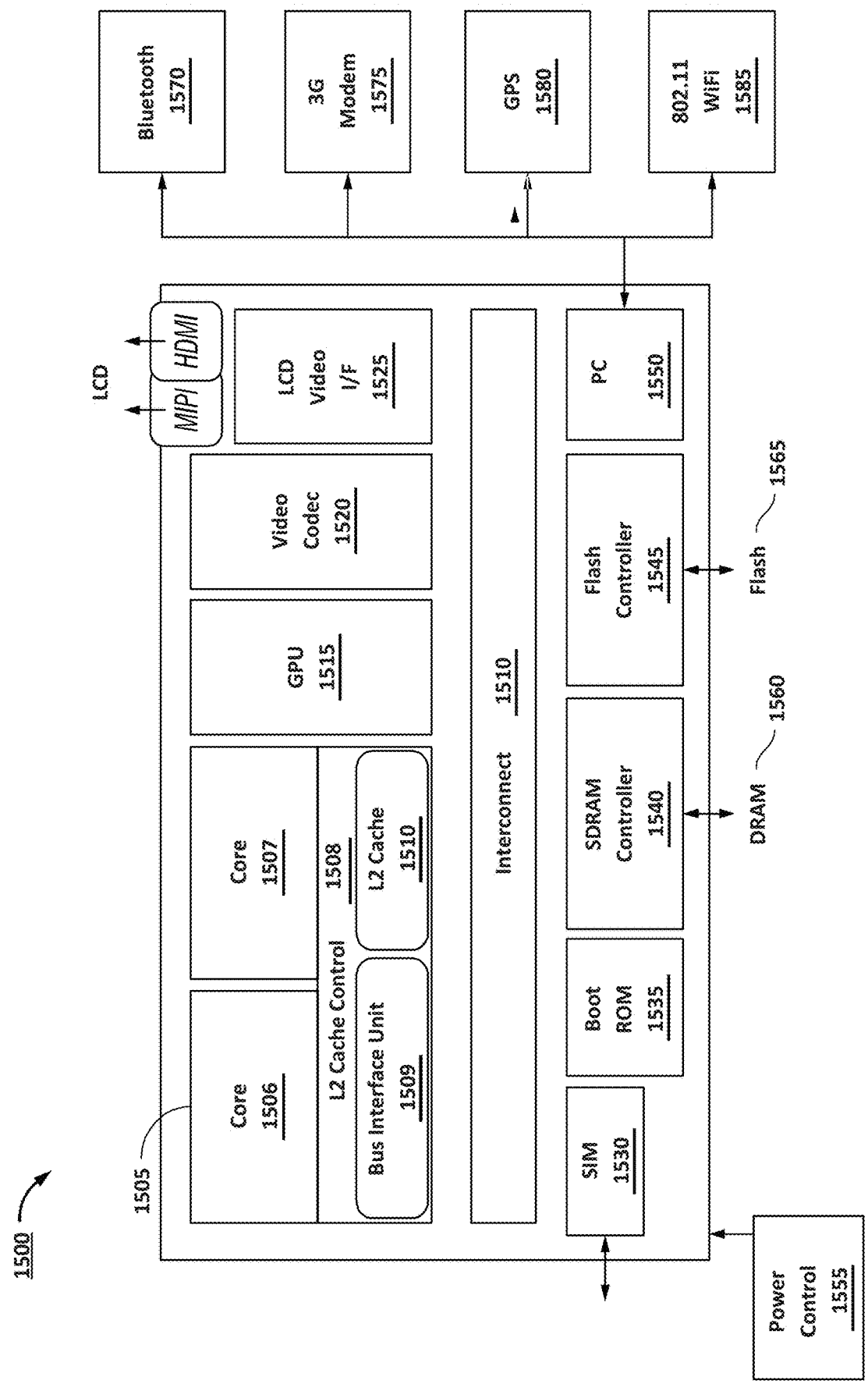
FIG. 15 illustrates another embodiment of a block diagram for a computing system.

FIG. 15 illustrates another embodiment of a block diagram for a computing system. Turning next to FIG. 15, an embodiment of a system on-chip (SOC) design in accordance with the inventions is depicted. As a specific illustrative example, SOC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1500 includes 2 cores-1506 and 1507. Similar to the discussion above, cores 1506 and 1507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1510 includes an on-chip interconnect, such as an IOSF, AMBA, or other interconnect discussed above, which potentially implements one or more aspects of the described invention.

Interface 1510 provides communication channels to the other components, such as a Subscriber Identity Module (SIM) 1530 to interface with a SIM card, a boot rom 1535 to hold boot code for execution by cores 1506 and 1507 to initialize and boot SOC 1500, a SDRAM controller 1540 to interface with external memory (e.g. DRAM 1560), a flash controller 1545 to interface with non-volatile memory (e.g. Flash 1565), a peripheral control Q1650 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the invention described herein.

In addition, the system illustrates peripherals for communication, such as a Bluetooth module 1570, 3G modem 1575, GPS 1585, and WiFi 1585. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The systems, methods, and apparatuses can include one or a combination of the following examples:

Example 1 is an apparatus comprising a controller and a command queue to buffer incoming write requests into the apparatus. The controller is to receive, from a client across a link, a non-posted write request in a transaction layer packet (TLP) to the command queue; determine that the command queue can accept the non-posted write request; generate a completion message with a completion status bit set to successful completion (SC); and transmit, to the client across the link, the completion message indicating that the non-posted write request was accepted into the command queue.

Example 2 may include the subject matter of example 1, wherein the non-posted write request comprises an deferred memory write (DMWr) request message.

Example 3 may include the subject matter of any of examples 2-3, the controller to receive a second non-posted write request in a second TLP; determine that the command queue is full; generate a completion message with a completion status bit set to memory request retry status (MRS); and transmit, to the client across the link, the completion message indicating that the non-posted write request was rejected into the command queue.

Example 4 may include the subject matter of example 3, the controller to receive a third TLP comprising a retry of the second non-posted write request; determine that the command queue can accept the second non-posted write request; generate a completion message with a completion status bit set to successful completion (SC); and transmit, to the client across the link, the completion message indicating that the non-posted write request was accepted into the command queue.

Example 5 may include the subject matter of any of examples 1-3, wherein the apparatus comprises an input/output device, such as an accelerator.

Example 6 may include the subject matter of any of examples 1-5, wherein the non-posted write request is received in a transaction layer packet (TLP) that comprises a type field indicating the acknowledged memory write request.

Example 7 may include the subject matter of example 6, wherein the TLP comprises a completion field that indicates completion without data for an acknowledged memory write completion.

Example 8 may include the subject matter of any of examples 1-7, wherein the link is based on a Peripheral Component Interconnect Express (PCIe) protocol.

Example 9 is a system comprising a host device comprising a port residing at the host device, the port to transmit a TLP containing a non-posted write request to the I/O device across the link; and an input/output (I/O) device coupled to the port across a link. The I/O device can receive the TLP comprising the non-posted write request from across the link, determine that the command queue has space available to accept the non-posted write request, generate a completion message with a completion status bit set to successful completion (SC). The port to transmit, to a client across the link, the completion message indicating that the non-posted write request was accepted into the command queue.

Example 10 may include the subject matter of example 9, wherein the non-posted write request is a first non-posted write request. To transmit a second TLP comprising a second non-posted write request to the I/O device. The I/O device to receive the second non-posted write request, determine that the command queue at the I/O device is full, and generate a completion message with a completion status bit set to memory request retry status (MRS) for transmission by the port to the client across the link, the completion message indicating that the non-posted write request was rejected into the command queue. The port to forward the message indicating the completion message of the non-posted write request to a link partner of the I/O device.

Example 11 may include the subject matter of any of examples 9, wherein the non-posted write request is a first non-posted write request.

Example 12 may include the subject matter of example 11, wherein the port is a first port, the host device comprising a second port, the second port comprising an egress blocking enabled, the second port to receive a second non-posted write request from a link partner; and transmit a completion message that comprises a status of unsupported request status identifier.

Example 13 may include the subject matter of example 11, wherein the I/O device is to receive a second non-posted write request, the second non-posted write request comprising a transaction layer packet that is corrupted; and transmit a completion message that includes an unsupported request status indicator to the first port.

Example 14 may include the subject matter of example 11, wherein the I/O device is to receive a second non-posted write request; determine that the second non-posted write request comprises an uncorrectable error; and transmit a completer abort message to the port.

Example 15 may include the subject matter of example 11, wherein the I/O device is to receive a second non-posted write request; determine that the second non-posted write request comprises an unsupported type or operand; and transmit a completion message with an unsupported request status indicator to the port.

Example 16 may include the subject matter of any of examples 9-15, wherein the I/O device comprises an accelerator device.

Example 17 may include the subject matter of any of examples 9-16, wherein the non-posted write request comprises an deferred memory write (DMWr) request.

Example 18 may include the subject matter of any of examples 9-17, wherein the command queue comprises a shared work queue (SWQ) and the non-posted write request is received at the SWQ of the I/O device.

Example 19 may include the subject matter of any of examples 9-18, wherein the link is based on a Peripheral Component Interconnect Express (PCIe) protocol.

Example 20 is a computer-implemented method comprising receiving, at an input/output (I/O) device from a client across a link, a non-posted write request in a transaction layer packet (TLP) to the command queue; determining, by a controller of the I/O device, that the command queue can accept the non-posted write request; generating a completion message with a completion status bit set to successful completion (SC); and transmitting, to the client across the link, the completion message indicating that the non-posted write request was accepted into the command queue.

Example 21 may include the subject matter of example 20, wherein the non-posted write request comprises a deferred memory write (DMWr) request message.

Example 22 may include the subject matter of any of examples 20-21, and may also include receiving, at the I/O device, a second non-posted write request in a second TLP; determining, by a controller of the I/O device, that the command queue is full; generating a completion message with a completion status bit set to memory request retry status (MRS); and transmitting, to the client across the link, the completion message indicating that the non-posted write request was rejected into the command queue.

Example 23 may include the subject matter of example 22, and may also include receiving a third TLP comprising a retry of the second non-posted write request; determining that the command queue can accept the second non-posted write request; generating a completion message with a completion status bit set to SC; and transmitting the completion message to the link partner.

Example 24 may include the subject matter of any of examples 20-23, and may also include receiving a second non-posted write request; determining that the second non-posted write request comprises an uncorrectable error; and transmit a completer abort message to the link partner.

Example 25 may include the subject matter of any of examples 20-24, and may also include receiving a second non-posted write request; determining that the non-posted write request comprises an unsupported type or operand; and transmitting a completion message with an unsupported request status indicator to the link partner.

Example 26 is an apparatus that includes a command queue to buffer incoming work requests and a means for determining, from a received transaction layer packet, a deferred memory write (DMWr) request and one or more response messages to the DMWr based on the status of the command queue.

What is claimed is:

1. An apparatus comprising:
a controller;
a non-volatile memory; and
a command queue to buffer incoming write requests into the non-volatile memory from multiple clients;
the controller to:
receive, from a client across a link, a non-posted write request in a transaction layer packet (TLP) to the command queue, wherein the non-posted write request comprises a Deferrable Memory Write (DMWr) request message, wherein the TLP comprises a type field that indicates that the non-posted write request is a DMWr request, the type field comprising a [4:0] b encoding of 11011;
determine that the command queue can accept the non-posted write request;
generate a completion message;
set a bit in a completion status field of the completion message to a value that indicates a successful completion (SC) that indicates that the non-posted write request was accepted into the command queue; and
transmit, to the client across the link, the completion message with the SC that indicates that the non-posted write request was accepted into the command queue.

2. The apparatus of claim 1, the controller to:
receive a second non-posted write request in a second TLP;
determine that the command queue is full;
generate a completion message;
set a bit in a completion status field of the completion message to a value that indicates a memory request retry status (MRS) that indicates that the command queue is full; and
transmit the completion message that includes the MRS to the client across the link;
wherein the encoding for the MRS comprises a [2:0] b encoding of 101.

3. The apparatus of claim 2, the controller to:
receive a third TLP comprising a retry of the second non-posted write request;
determine that the command queue can accept the second non-posted write request;
generate a completion message;
set a bit in a completion status field of the completion message to a value that indicates an SC that indicates that the non-posted write request was accepted into the command queue; and
transmit the completion message with the SC to the client across the link.

4. The apparatus of claim 1, wherein the apparatus comprises an input/output device.

5. The apparatus of claim 1, wherein the TLP comprises a completion field that indicates completion without data for an acknowledged memory write completion.

6. The apparatus of claim 1, wherein the link is based on a Peripheral Component Interconnect Express (PCIe) protocol.

7. The apparatus of claim 1, wherein the completion message comprises a [2:0] b encoding of 000 to indicate the SC.

8. The apparatus of claim 1, wherein apparatus comprises a hardware accelerator.

9. A system comprising:
a host device comprising a port residing at the host device, the port to transmit a transaction layer packet (TLP) comprising a non-posted write request to the I/O device across a link, wherein the non-posted write request comprises a Deferrable Memory Write (DMWr) request message, wherein the TLP comprises a type field that indicates that the non-posted write request is a DMWr request, the type field comprising a [4:0] b encoding of 11011; and
an input/output (I/O) device coupled to the port across the link, the I/O device to:
receive the TLP comprising the non-posted write request from across the link,
determine that a command queue has space available to accept the non-posted write request,
generate a completion message;
set a completion status of the completion message to Successful Completion (SC) that indicates that the non-posted write request was accepted into the command queue, and
transmit the completion message to the port;
the port to transmit the SC message to a link partner of the host device.

10. The system of claim 9, wherein the non-posted write request is a first non-posted write request;
the port to transmit a second TLP comprising a second non-posted write request to the I/O device;
the I/O device to:
receive the second non-posted write request,
determine that the command queue at the I/O device is full,
generate a completion message with a completion status bits set to memory request retry status (MRS), the MRS encoded as [2:0] b having a value of 101 and
transmit to the port across the link the completion message;
the port to forward the message that indicates the retry of the non-posted write request to a link partner of the I/O device.

11. The system of claim 10, wherein the completion message comprises a [2:0] b encoding of 000 to indicate the SC.

12. The system of claim 9, wherein the non-posted write request is a first non-posted write request.

13. The system of claim 12, wherein the port is a first port, the host device comprising a second port, the second port comprising an egress blocking enabled, the second port to:
receive a second non-posted write request from a link partner; and
transmit a completion message that comprises a status of unsupported request status identifier.

14. The system of claim 12, wherein the I/O device is to:
receive a second non-posted write request, the second non-posted write request comprising a transaction layer packet that is corrupted; and
transmit a completion message that includes an unsupported request status indicator to the first port.

15. The system of claim 12, wherein the I/O device is to:
receive a second non-posted write request;
determine that the second non-posted write request comprises an uncorrectable error; and
transmit a completer abort message to the port.

16. The system of claim 12, wherein the I/O device is to:
receive a second non-posted write request;
determine that the second non-posted write request comprises an unsupported type or operand; and
transmit a completion message with an unsupported request status indicator to the port.

17. The system of claim 9, wherein the I/O device comprises an accelerator device.

18. The system of claim 9, wherein the command queue comprises a shared work queue (SWQ) and the non-posted write request is received at the SWQ of the I/O device.

19. The system of claim 9, wherein the link is based on a Peripheral Component Interconnect Express (PCIe) protocol.

20. A computer-implemented method comprising:
receiving, at an input/output (I/O) device from a client across a link, a non-posted write request in a transaction layer packet (TLP) to the command queue, wherein the non-posted write request comprises an Deferrable Memory Write (DMWr) request message, wherein the TLP comprises a type field that indicates that the non-posted write request is a DMWr request, the type field comprising a [4:0] b encoding of 11011;
determining, by a controller of the I/O device, that the command queue can accept the non-posted write request;
generating a completion message with a completion status bit set to successful completion (SC); and
transmitting, to the client across the link, the completion message.

21. The method of claim 20, further comprising:
receiving, at the I/O device, a second non-posted write request in a second TLP;
determining, by a controller of the I/O device, that the command queue is full;
generating a completion message with a completion status bit set to memory request retry status (MRS); and
transmitting, to the client across the link, the completion message.

22. The method of claim 21, further comprising:
receiving a third TLP comprising a retry of the second non-posted write request;
determining that the command queue can accept the second non-posted write request;
generating a completion message with a completion status bit set to SC; and
transmitting, to the client across the link, the completion message.

23. The method of claim 20, further comprising:
receiving a second non-posted write request;
determining that the second non-posted write request comprises an uncorrectable error; and
transmit a completer abort message to the link partner.

24. The method of claim 20, further comprising:
receiving a second non-posted write request;
determining that the non-posted write request comprises an unsupported type or operand; and
transmitting a completion message with an unsupported request status indicator to the link partner.

25. The method of claim 20, wherein the completion message comprises a [2:0] b encoding of 000 to indicate the SC.

* * * * *